(12) United States Patent
Takayama et al.

(10) Patent No.: US 8,942,629 B2
(45) Date of Patent: Jan. 27, 2015

(54) COMMUNICATION SYSTEM, COMMUNICATION METHOD, AND DATA PROCESSING APPARATUS

(71) Applicant: Sony Corporation, Tokyo (JP)

(72) Inventors: Yoshihisa Takayama, Kanagawa (JP);
Susumu Kusakabe, Tokyo (JP);
Kazushige Tsurumi, Kanagawa (JP);
Tadashi Morita, Tokyo (JP); Kunihide Fujii, Tokyo (JP)

(73) Assignee: Sony Corporation, Tokyo (JP)

( * ) Notice: Subject to any disclaimer, the term of this patent is extended or adjusted under 35 U.S.C. 154(b) by 177 days.

(21) Appl. No.: 13/757,109

(22) Filed: Feb. 1, 2013

(65) Prior Publication Data
US 2013/0143492 A1    Jun. 6, 2013

Related U.S. Application Data

(63) Continuation of application No. 13/476,673, filed on May 21, 2012, now Pat. No. 8,417,184, which is a continuation of application No. 11/954,838, filed on Dec. 12, 2007, now Pat. No. 8,224,243, which is a continuation of application No. 10/503,936, filed as application No. PCT/JP03/13753 on Oct. 28, 2003.

(30) Foreign Application Priority Data

Dec. 17, 2002  (JP) ................................ 2002-364748
Aug. 29, 2003  (JP) ................................ 2003-307840

(51) Int. Cl.
| | |
|---|---|
| *H04B 5/00* | (2006.01) |
| *H04B 7/00* | (2006.01) |
| *G06K 7/10* | (2006.01) |
| *G06K 19/07* | (2006.01) |
| *H04N 21/258* | (2011.01) |

(52) U.S. Cl.
CPC .......... *H04B 5/0031* (2013.01); *G06K 7/10237* (2013.01); *G06K 19/0723* (2013.01); *H04B 5/0056* (2013.01); *H04N 21/25808* (2013.01)
USPC ....................................... 455/41.1; 455/41.2

(58) Field of Classification Search
USPC ................. 455/41.1, 41.2; 370/346; 340/3.51
See application file for complete search history.

(56) References Cited

U.S. PATENT DOCUMENTS

| | | | |
|---|---|---|---|
| 5,349,649 A | 9/1994 | Iijima | |
| 5,727,230 A | 3/1998 | Fujioka | |

(Continued)

FOREIGN PATENT DOCUMENTS

| | | |
|---|---|---|
| EP | 0 680 002 | 4/1995 |
| EP | 0 733 987 | 3/1996 |

(Continued)

OTHER PUBLICATIONS

Japanese Office Action issued Apr. 3, 2012 in patent application No. 2010-163164.

*Primary Examiner* — Joel Ajayi
(74) *Attorney, Agent, or Firm* — Oblon, Spivak, McClelland, Maier & Neustadt, L.L.P.

(57) ABSTRACT

A communication system and communication method enable various types of near field communication. NFC communication apparatuses have two features in that each can perform communication in two communication modes and that each can perform data transmission at a plurality of transfer rates. The two communication modes consist of a passive mode and an active mode. In the passive mode, between the NFC communication apparatuses, for example, a first NFC communication apparatus transmits data to a second NFC communication apparatus by modulating electromagnetic waves generated by itself, while the second NFC communication apparatus transmits data to the first NFC communication apparatus by performing load modulation on the electromagnetic waves generated by the first NFC communication apparatus. Alternatively, in the active mode, either of the NFC communication apparatuses transmits data by modulating electromagnetic waves generated by itself. The present innovation can be applied to, for example, an IC card system, etc.

1 Claim, 29 Drawing Sheets

(56) References Cited

U.S. PATENT DOCUMENTS

| | | |
|---|---|---|
| 5,748,915 A | 5/1998 | Iijima |
| 6,282,407 B1 | 8/2001 | Vega et al. |
| 6,294,980 B1 | 9/2001 | Berger et al. |
| 6,704,608 B1 | 3/2004 | Azuma |
| 6,772,245 B1 | 8/2004 | Pomerantz et al. |
| 2002/0063622 A1 | 5/2002 | Armstrong et al. |

FOREIGN PATENT DOCUMENTS

| | | |
|---|---|---|
| EP | 1 001 366 A2 | 5/2000 |
| JP | 5-120497 | 5/1993 |
| JP | 7-296125 | 11/1995 |
| JP | 8-263608 | 10/1996 |
| JP | 10-13312 A | 1/1998 |
| JP | 11-191745 | 7/1999 |
| JP | 11-345291 | 12/1999 |
| JP | 2001-77790 | 3/2001 |
| JP | 2002-217839 A | 8/2002 |
| JP | 2002-247133 | 8/2002 |
| JP | 2002-524938 | 8/2002 |
| JP | 2002-291042 | 10/2002 |
| JP | 2003-203213 | 7/2003 |
| JP | 2003-216902 | 7/2003 |
| JP | 2003-288561 | 10/2003 |
| WO | WO 02/33644 A1 | 4/2002 |

FIG. 12

| COMMANDS/RESPONSES |
|---|
| ATR_REQ |
| ATR_RES |
| WUP_REQ |
| WUP_RES |
| PSL_REQ |
| PSL_RES |
| DEP_REQ |
| DEP_RES |
| DSL_REQ |
| DSL_RES |
| RLS_REQ |
| RLS_RES |

FIG. 29

NFCIP-1 PROTOCOL COMMANDS

| NAME | DEFINITION |
|---|---|
| ATR_REQ | Attribute Request(TRANSMITTED BY INITIATOR) |
| ATR_RES | Attribute Response(TRANSMITTED BY TARGET) |
| WUP_REQ | Wakeup Request(TRANSMITTED ONLY IN ACTIVE MODE BY INITIATOR) |
| WUP_RES | Wakeup Response(TRANSMITTED ONLY IN ACTIVE MODE BY TARGET) |
| PSL_REQ | Parameter selection Request(TRANSMITTED BY INITIATOR) |
| PSL_RES | Parameter selection Response(TRANSMITTED BY TARGET) |
| DEP_REQ | Data Exchange Protocol Request(TRANSMITTED BY INITIATOR) |
| DEP_RES | Data Exchange Protocol Response(TRANSMITTED BY TARGET) |
| DSL_REQ | Deselect Request(TRANSMITTED BY INITIATOR) |
| DSL_RES | Deselect Response(TRANSMITTED BY TARGET) |
| RLS_REQ | Release Request(TRANSMITTED BY INITIATOR) |
| RLS_RES | Release Response(TRANSMITTED BY TARGET) |

COMMUNICATION SYSTEM, COMMUNICATION METHOD, AND DATA PROCESSING APPARATUS

CROSS-REFERENCES TO RELATED APPLICATIONS

This application is a continuation of and claims the benefit of priority under 35 U.S.C. §120 from U.S. Ser. No. 13/476,673, filed May 21, 2012, which is a continuation of U.S. Ser. No. 11/954,838, filed Dec. 12, 2007, now U.S. Pat. No. 8,224,243, which is a continuation of U.S. Ser. No. 10/503,936, filed Aug. 16, 2004, now U.S. Pat. No. 7,346,061, and from prior Japan Patent Application Nos. 2002-364748, filed Dec. 17, 2002, and 2003-307840, filed Aug. 29, 2003. The entire contents of U.S. Ser. Nos. 11/954,838 and 13/476,673 are incorporated herein by reference.

TECHNICAL FIELD

The present invention relates to communication systems, communication methods, and data processing apparatuses, and in particular, to a communication system, a communication method, and a data processing apparatus which enable various types of short-range communication, which match needs, etc.

BACKGROUND ART

For example, an IC (Integrated Circuit) system is widely known as a system for performing short-range communication. In an IC card system, a so-called RF (Radio Frequency) field is formed such that a reader/writer generates electromagnetic waves. When an IC card is brought close to the reader/writer, the IC card is supplied with power through electromagnetic induction and performs data transfer between it and the reader/writer (see, for example, Japanese Unexamined Patent Application Publication No. 10-13312).

Presently implemented specifications of IC card systems include, for example, those called Type A, Type B, and Type C.

Type A is employed as the MIFARE method of Philips. For data transmission from a reader/writer to an IC card, Miller-based data encoding is performed. For data transmission from an IC card to a reader/writer, Manchester-based data encoding is performed. Also, in Type A, 106 kbps (kilo bit per second) is employed as a data transfer rate.

In Type B, for data transmission from a reader/writer to an IC card, data encoding based on NRZ is performed, while, for data transmission from an IC card to a reader/writer, data encoding based on NRZ-L is performed. Also, in Type B, 106 kbps is employed as a data transfer rate.

Type C is employed as the Felica method of Sony Corporation, the present Applicant. For data transmission from a reader/writer to an IC card, Manchester-based data encoding is performed. In Type C, 212 kbps is employed as a data transfer rate.

Accordingly, when considering, for example, the transfer rates, Types A (or B) and C differ in transfer rate. Thus, use of an IC card based on the other type in a service in which Type A or C is employed is difficult since users may become confused, etc.

Also, it is expected that IC card systems enabling data transmission at, for example, 424 kbps and 848 kbps will appear. In such a case, it is required that compatibility with the existing IC card system be achieved.

In addition, conventionally, a reader/writer transmits data to an IC card by modulating (a carrier corresponding to) electromagnetic waves generated by the reader/writer, and the IC card transmits data to the reader/writer by performing load modulation on (a carrier corresponding to) electromagnetic waves generated by the IC card. Thus, even if IC cards exchange data, it is required that a reader/writer be provided therebetween.

However, from now, it is expected that the need for IC cards themselves to generate electromagnetic waves and to directly exchange data will increase.

DISCLOSURE OF INVENTION

The present invention is made in view of such circumstances, and enables various types of near field communication.

In a communication system of the present invention: first and second data processing apparatuses each comprises: modulating means for modulating a carrier into a signal of data to be transmitted at one of a plurality of transfer rates; and demodulating means for demodulating a signal of data transmitted at one of a plurality of transfer rates; a transfer rate for use between the first and second data processing apparatuses is changeable in one transaction; each apparatus of the first and second data processing apparatuses has, as communication modes, an active mode in which the apparatus transmits data by outputting a carrier; and a passive mode in which one data processing apparatus of the first and second data processing apparatuses transmits data by outputting a carrier, while the other data processing apparatus transmits data by performing load modulation on the carrier output by the one data processing apparatus; and data transmission is performed by using any communication mode of the active mode and the passive mode, the communication mode being maintained during at least one transaction.

A communication method of the present invention comprises: a selecting step of selecting, by a first data processing apparatus, a target apparatus as a communication party from among at least one second data processing apparatus; a transmission-rate determining step of determining a transfer rate for use in data transmission by the first and second data processing apparatuses from among a plurality of transfer rates; a changing step of changing a communication parameter concerning communication between the first data processing apparatus and the target apparatus; a data exchanging step of, by transmitting a command to request data exchange by the first data processing apparatus, and transmitting a response to the command by the target apparatus, exchanging data between the first data processing apparatus and the target apparatus; and a releasing step of releasing the second data processing apparatus, which is selected as the target apparatus; and between two communication modes consisting of an active mode in which the first data processing apparatus and the target apparatus themselves output carriers, whereby data is transmitted, and a passive mode in which the first data processing apparatus itself outputs a carrier and the target apparatus performs load modulation on the carrier output by the first data processing apparatus, whereby data is transmitted, a communication mode for use in data transmission by the first data processing apparatus and the target apparatus is set.

In a first data processing apparatus of the present invention, a modulating means transmits data at a plurality of transfer rates, and identifies a communication party, based on a response sent back for data transmission at each of the transfer rates, and, in addition, determines a transfer rate for use in data transmission with the communication party.

In a second data processing apparatus of the present invention, a modulating means performs data transmission with a communication party by transmitting, to the communication party, a response to a command which is acquired after being transmitted from the communication party, and a demodulating means performs demodulation at a plurality of transfer rates, and determines, from among the transfer rates, the transfer rate of data capable of being demodulated by the demodulating means, as a transfer rate for use in data transmission with the communication party.

In a communication system of the present invention, a carrier is modulated into a signal of data to be transmitted at one of a plurality of transfer rates, and a signal of data transmitted at one of a plurality of transfer rates is demodulated. A transfer rate for use between first and second data processing apparatuses is changeable in one transaction. The first and second data processing apparatuses each have, as communication modes, an active mode in which the apparatus transmits data by outputting a carrier; and a passive mode in which one data processing apparatus of the first and second data processing apparatuses transmits data by outputting a carrier, while the other data processing apparatus transmits data by performing load modulation on the carrier output by the one data processing apparatus. Data is transmitted by using any communication mode of the active mode and the passive mode, the communication mode being maintained during at least one transaction.

In a communication method of the present invention, a first data processing apparatus selects a target apparatus as a communication party from among at least one second data processing apparatus, and, among a plurality of transfer rates, a transfer rate for use in data transmission between the first and second data processing apparatuses is determined. In addition, after a communication parameter concerning the communication between the first data processing apparatus and the target apparatus is changed, the first data processing apparatus transmits a command to request data exchange, and the target apparatus transmits a response to the command, whereby data exchange is performed between the first data processing apparatus and the target apparatus. Between two communication modes consisting of an active mode in which the first data processing apparatus and the target apparatus themselves output carriers, whereby both apparatuses transmit data, and a passive mode in which the first data processing apparatus itself outputs a carrier and the target apparatus performs load modulation on the carrier output by the first data processing apparatus, whereby both apparatuses transmit data, a communication mode for use in data transmission by the first data processing apparatus and the target apparatus is set.

A first data processing apparatus of the present invention transmits data at a plurality of transfer rates, and, based on a response sent back for data transmission at each of a plurality of transfer rates, identifies a communication party. In addition, among a plurality of transfer rates, a transfer rate for use in data transmission with the communication party is determined.

A second data processing apparatus of the present invention transmits a response to a command which is acquired by a demodulating means after being transmitted from a communication party, whereby data transmission with the communication party is performed. Also, demodulation at a plurality of transfer rates is performed, and, among a plurality of transfer rates, the transfer rate of data capable of being demodulated is determined as a transfer rate for use in data transmission with the communication party.

BRIEF DESCRIPTION OF THE DRAWINGS

FIG. 12 is an illustration of a list of commands and responses.

FIG. 29 is an illustration of NFCIP-1 protocol commands and responses to the commands.

BEST MODE FOR CARRYING OUT THE INVENTION

Embodiments of the present invention are described below with reference to the drawings.

Figure 1:
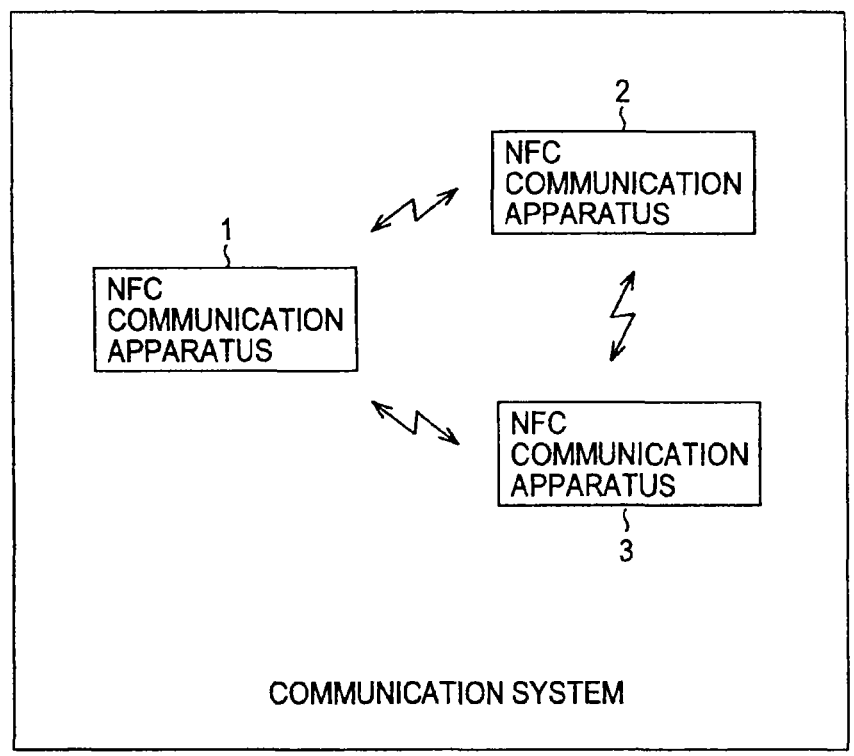
FIG. 1 is a diagram showing the configuration of an embodiment of a communication system to which the present invention is applied.

FIG. 1 shows the configuration of an embodiment of a communication system (the system represents a body formed by logically connected apparatuses irrespective of whether or not the configurations of the apparatuses are within a single housing) to which the present invention is applied.

In FIG. 1, the communication system is constituted by three NFC communication apparatuses 1, 2, and 3. The NFC communication apparatuses 1 to 3 can perform near field communication (NFC) to one another which is based on electromagnetic induction and which use carriers having a single frequency.

Here, as the frequency of the carriers used by the NFC communication apparatuses 1 to 3, for example, 13.56 MHz in the ISM (Industrial Scientific Medical) band, etc., can be used.

Also, the near field communication represents communication that becomes possible when the distance between communicating apparatuses is within dozens of centimeters, and includes also communication that is performed such that (the housings of) communicating apparatuses touch each other.

In the communication system in FIG. 1, among the NFC communication apparatuses 1 to 3, definitely, at least one can be employed as a reader/writer, and another one or more can be employed as an IC card system with them as IC cards. The NFC communication apparatuses 1 to 3 can be employed as communication systems such as PDAs (Personal Digital Assistants), PCs (Personal Computers), cellular phones, and pens. In other words, the NFC communication apparatuses 1 to 3 are apparatus performing near field communication, and are not limited to IC cards and reader/writers in an IC card system.

The NFC communication apparatuses 1 to 3 have two features firstly in that communication is possible in two communication modes, and secondly in that data transmission based on a plurality of transfer rates is possible.

The two communication modes consist of a passive mode and an active mode. In the case of paying attention to, for example, communication between the NFC communication apparatuses 1 and 2 among the NFC communication apparatuses 1 to 3, in a passive mode, similarly to the above IC card system of the related art, one NFC communication apparatus between the NFC communication apparatuses 1 and 2, for example, the NFC communication apparatus 1 transmits data to the NFC communication apparatus 2, which is the other NFC communication apparatus, by modulating (a carrier corresponding to) electromagnetic waves that the NFC communication apparatus 1 itself generates, and the NFC communication apparatus 2 transmits data to the NFC communication apparatus 1 by performing load modulation on (the carrier corresponding to) electromagnetic waves that the NFC communication apparatus 1 generates.

On the other hand, in an active mode, either apparatus of the NFC communication apparatuses 1 and 2 transmits data by modulating (a carrier corresponding to) electromagnetic waves generated by the apparatus.

Here, when near field communication based on electromagnetic induction is performed, an apparatus that initiates communication by initially outputting electromagnetic waves, so to speak, an apparatus that takes control of communication, is called an initiator. Near field communication is performed in a form in which the initiator transmits a command to another communication party and the communication party sends back a response to the command. A communication party that sends back a response to a command from the initiator is called a target.

Figure 2:
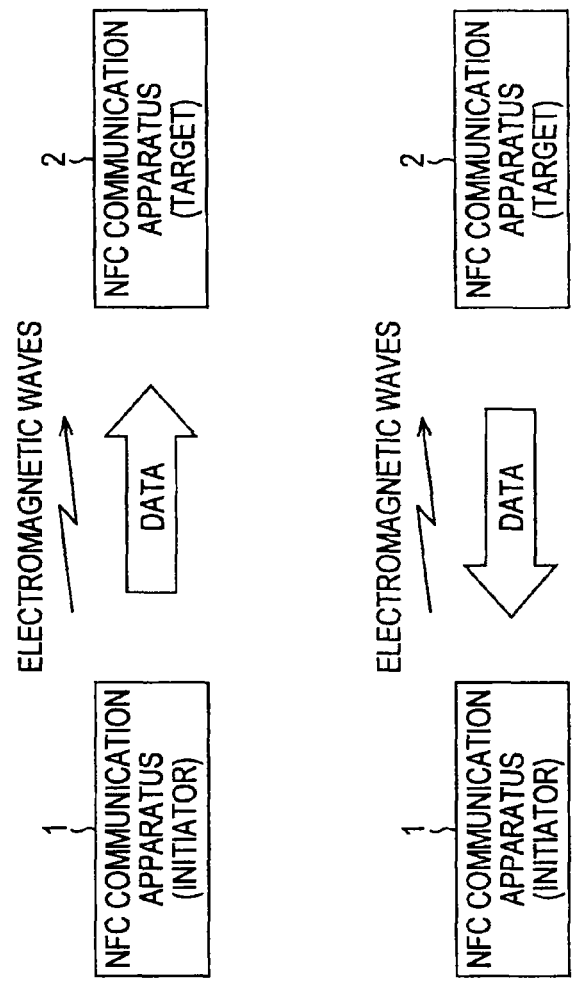
FIG. 2 is an illustration of a passive mode.
Figure 3:
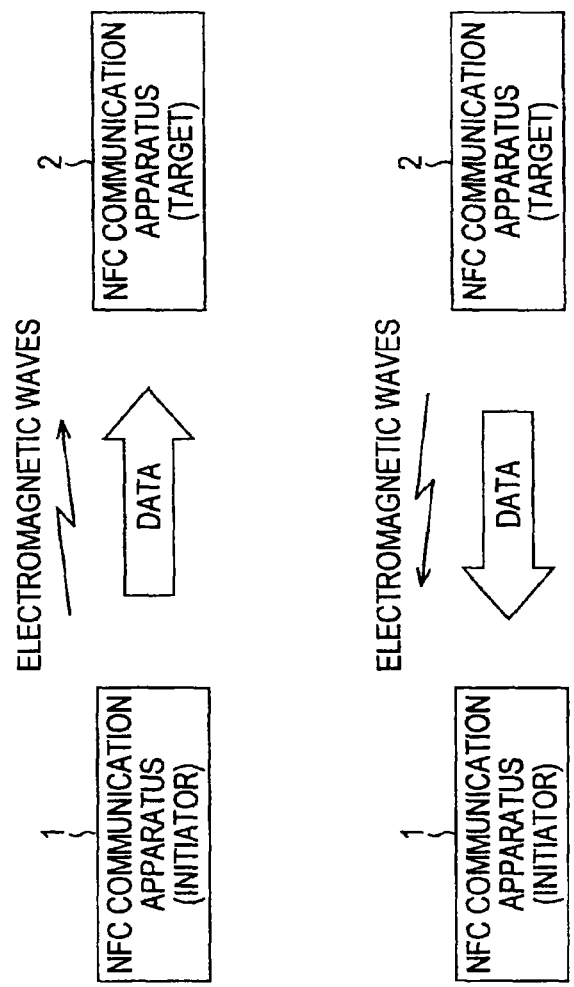
FIG. 3 is an illustration of an active mode.

For example, when it is assumed that the NFC communication apparatus 1 initiates output of electromagnetic waves to initiate communication with the NFC communication apparatus 2, as FIG. 2 and FIG. 3 show, the NFC communication apparatus 1 is an initiator, and the NFC communication apparatus 2 is a target.

In the passive mode, as shown in FIG. 2, the NFC communication apparatus 1, which is the initiator, continues to output electromagnetic waves, and transmits data to the NFC communication apparatus 2, which is the target, by modulating the electromagnetic waves that the NFC communication apparatus 1 itself outputs. In addition, the NFC communication apparatus 2 transmits data to the NFC communication apparatus 1 by performing load modulation on the electromagnetic waves that the NFC communication apparatus 1, which is the initiator, outputs.

Alternatively, in the active mode, as shown in FIG. 3, when the NFC communication apparatus 1, which is the initiator, transmits data, it initiates output of electromagnetic waves by itself, and transmits data to the NFC communication apparatus 2, which is the target, by modulating the electromagnetic waves. The NFC communication apparatus 1 stops outputting the electromagnetic waves after ending the transmission of the data. When the NFC communication apparatus 2 itself, which is the target, transmits data, it initiates output of electromagnetic waves, and transmits data to the NFC communication apparatus 2, which is the target, by modulating the electromagnetic waves. The NFC communication apparatus 2 stops outputting the electromagnetic waves after ending the transmission of the data.

The second feature that the NFC communication apparatuses 1 to 3 can perform data transmission at a plurality of transfer rates is described later.

Although, in FIG. 1, three NFC communication apparatuses 1 to 3 constitute the communication system, the NFC communication apparatuses constituting the communication system are not limited to three, but may be two, or at least four. In addition, the communication system can be constituted including, for example, an IC card and reader/writer included in the IC card system of the related art, in addition to the NFC communication apparatuses.

Figure 4:
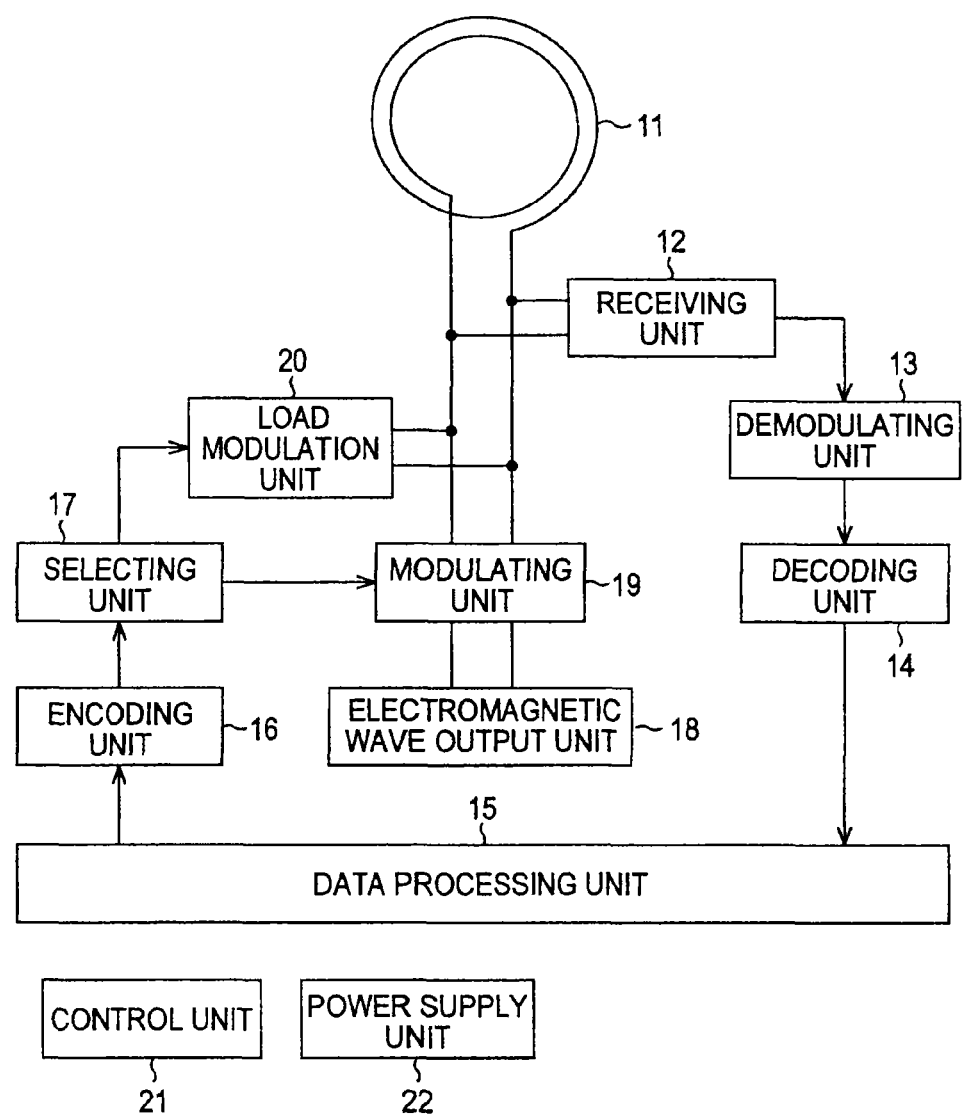
FIG. 4 is a block diagram showing an example of an NFC communication apparatus 1.

Next, FIG. 4 shows an example of the NFC communication apparatus 1 in FIG. 1. A description of the other NFC communication apparatuses 2 and 3 in FIG. 1 is omitted since they are also similar in configuration to the NFC communication apparatus 1 in FIG. 4.

An antenna 11 is in the form of a closed loop coil, and outputs electromagnetic waves based on changes in a current flowing in the coil. Changes in magnetic flux through the coil as the antenna 11 cause a current to flow in the antenna 11.

A receiving unit 12 receives the current flowing in the antenna 11, performs tuning and detection, and outputs a signal to a demodulating unit 13. The demodulating unit 13 demodulates the signal supplied from the receiving unit 12 and supplies the demodulated signal to a decoding unit 14. The decoding unit 14 decodes the signal supplied from the demodulating unit 13, for example, a Manchester code or the like, and supplies a data processing unit 15 with data obtained by the decoding.

The data processing unit 15 performs predetermined processing based on the data supplied from the decoding unit 14. Also, the data processing unit 15 supplies an encoding unit 16 with data to be transmitted to another apparatus.

The encoding unit 16 encodes the data supplied from the data processing unit 15 into, for example, a Manchester code, and supplies the code to a selecting unit 17.

The selecting unit 17 selects either a modulating unit 19 or a load modulation unit 20, and outputs the signal supplied from the encoding unit 16 to the selected unit.

At this time, under the control of a control unit 21, the selecting unit 17 selects the modulating unit 19 or the load modulation unit 20. The control unit 21 controls the selecting unit 17 to select the load modulation unit 20 when the communication mode is a passive mode, and the NFC communication apparatus 1 is a target. Also, when the communication mode is an active mode, or the communication mode is a passive mode and the NFC communication apparatus 1 is an initiator, the control unit 21 controls the selecting unit 17 to select the modulating unit 19. Accordingly, the signal output by the encoding unit 16 is supplied to the load modulation unit 20 through the selecting unit 17 when the communication mode is the passive mode and the NFC communication apparatus 1 is the target, and is supplied to the modulating unit 19 through the selecting unit 17 in other cases.

An electromagnetic wave output unit 18 supplies the antenna 11 with a current for allowing the antenna 11 to radiate (electromagnetic waves of) a carrier having a predetermined single frequency. In accordance with the signal supplied from the selecting unit 17, the modulating unit 19 modulates the carrier as the current supplied to the antenna 11 by the electromagnetic wave output unit 18. This allows the antenna 11 to radiate carrier-modulated electromagnetic waves in accordance with data output to the encoding unit 16 by the data processing unit 15.

The load modulation unit 20 changes, in accordance with the signal supplied from the selecting unit 17, an impedance obtained when the coil as the antenna 11 is externally observed. When an RF field (magnetic field) is formed around the antenna 11 such that another apparatus outputs electromagnetic waves as a carrier, the impedance, obtained when the coil as the antenna 11 is observed, changes, whereby the RF field around the antenna 11 also changes.

This modulates the carrier as the electromagnetic waves output by the other apparatus in accordance with the signal supplied from the selecting unit 17, and transmits, to the other apparatus outputting the electromagnetic waves, the data output to the encoding unit 16 by the data processing unit 15.

Here, for example, Amplitude Shift Keying (ASK) can be employed as a modulation method in the modulating unit 19 and the load modulation unit 20. However, the modulation method in the modulating unit 19 and the load modulation unit 20 is not limited to ASK, but PSK (Phase Shift Keying), QAM (Quadrature Amplitude Modulation), etc., can be employed.

The modulation factor of the amplitude is not limited to numeric values, such as 8% to 30%, 50%, and 100%, but a suitable value may be selected.

The control unit 21 controls blocks constituting the NFC communication apparatus 1. A power supply unit 22 supplies necessary power to the blocks constituting the NFC communication apparatus 1. In FIG. 4, representation of lines showing that the control unit 21 controls the blocks constituting the NFC communication apparatus 1, and representation of lines showing that the load circuit 22 supplies power to the NFC communication apparatus 1 complicate FIG. 4. Accordingly, the representations are omitted.

Although, in the above case, the decoding unit 14 and the encoding unit 16 can process the Manchester code as employed in the above Type C, the decoding unit 14 and the encoding unit 16 can selectively process, not only the Manchester code, but also one of plural types of codes such as a modified Miller code as employed in Type A and NRZ as employed in Type C.

Figure 5:
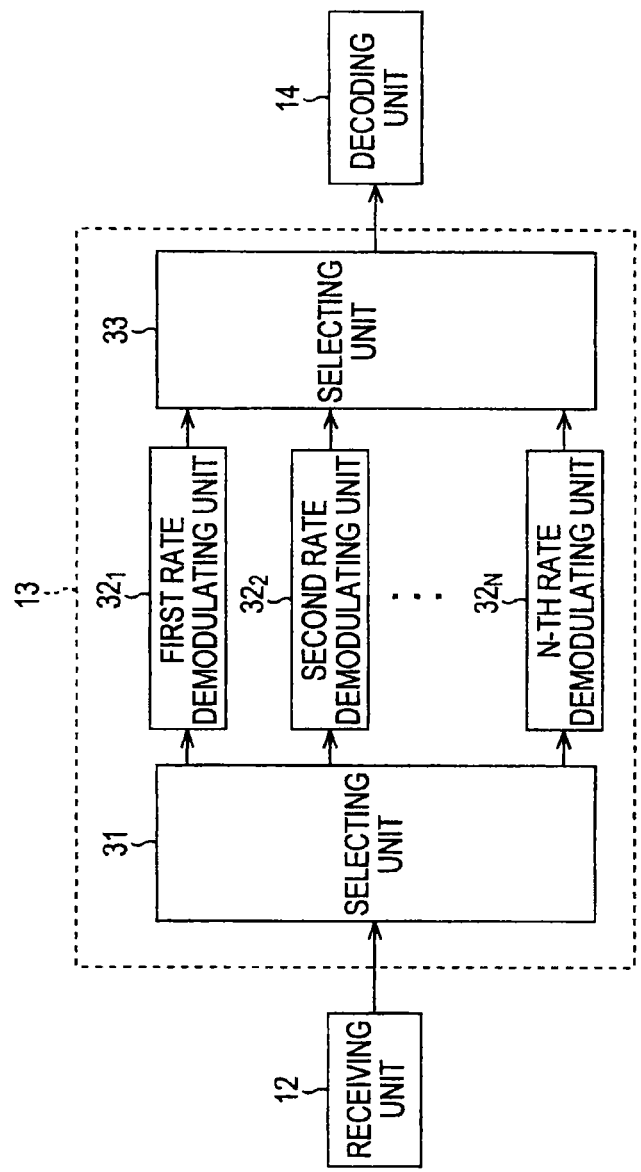
FIG. 5 is a block diagram showing an example of a demodulating unit 13.

Next, FIG. 5 shows an example of the demodulating unit 13 in FIG. 4.

In FIG. 5, the demodulating unit 13 includes a selecting unit 31, N demodulating units $32_1$ to $32_N$ where N is 2 or greater, and a selecting unit 33.

Under the control of the control unit 21 (FIG. 4), the selecting unit 31 selects one demodulating unit $32_n$ (n=1, 2, ..., N) from among the N demodulating units $32_1$ to $32_N$, and supplies the selected demodulating unit $32_n$ with the signal output by the receiving unit 12.

The demodulating unit $32_n$ demodulates a signal transmitted at the n-th transfer rate and supplies the demodulated signal to the selecting unit 33. Here, the demodulating unit $32_n$ and demodulating unit $32_{n'}$ (n≠n') demodulate signals transmitted at different transfer rates. Accordingly, the demodulating unit 13 in FIG. 5 can demodulate signals transmitted at N transfer rates from the first to the N-th. For example, 106 kbps, 212 kbps, 424 kbps, 848 kbps, etc., as described above, can be employed as the N transfer rates. In other words, the N transfer rates can include, for example, transfer rates already employed for near field communication such as the existing IC card systems and the other transfer rates.

Under the control of the control unit 21, the selecting unit 33 selects one demodulating unit $32_n$ from among the N demodulating units $32_1$ to $32_N$, and supplies the demodulated output obtained in the demodulating unit $32_n$ to the decoding unit 14.

In the demodulating unit 13 having the above-described configuration, the control unit 21 (FIG. 4) controls, for example, the selecting unit 31 to sequentially select the N demodulating units $32_1$ to $32_N$, whereby each of the demodulating units $32_1$ to $32_N$ is controlled to demodulate the signal supplied from the receiving unit 12 through the selecting unit 31. The control unit 21 recognizes the demodulating unit $32_n$, which has successfully performed normal demodulation of the signal supplied from the receiving unit 12 through the selecting unit 31, and controls the selecting unit 33 to select the output of the demodulating unit $32_n$. Under the control of the control unit 21, the selecting unit 33 selects the demodulating unit $32_n$, whereby the normal demodulated output obtained in the demodulating unit $32_n$ is supplied to the decoding unit 14.

Accordingly, the demodulating unit 13 can demodulate a signal transmitted at an arbitrary transfer rate among the N transfer rates.

Only when the demodulating units $32_1$ to $32_N$ have successfully performed normal demodulation can they output demodulated outputs, and they can output nothing (for example, they have high impedance) if they have failed to perform normal demodulation. In this case, the selecting unit 33 may output the logical sum of all the outputs of the demodulating units $32_1$ to $32_N$ to the decoding unit 14.

Figure 6:
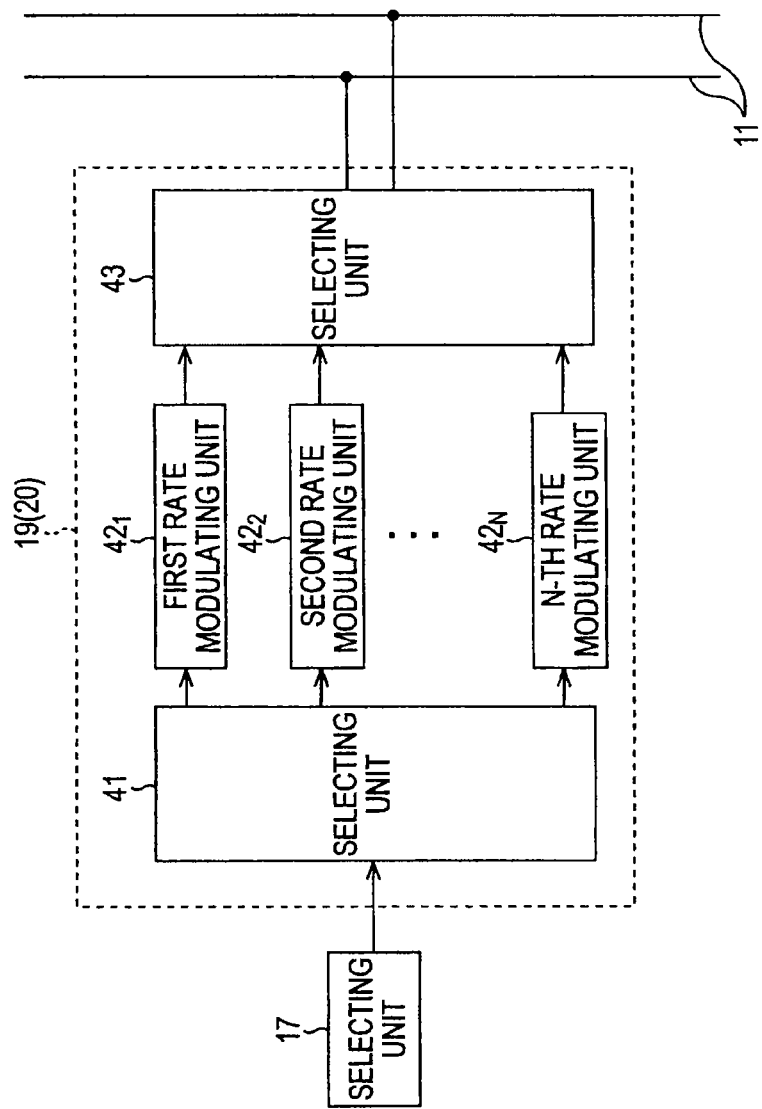
FIG. 6 is a block diagram showing an example of a modulating unit 19.

Next, FIG. 6 shows an example of the modulating unit 19 in FIG. 4.

In FIG. 6, the modulating unit 19 includes a selecting unit 41, and N modulating units $42_1$ to $42_N$ where N is two or greater, and a selecting unit 43.

Under the control of the control unit 21 (FIG. 4), the selecting unit 41 selects one modulating unit $42_n$ (n=1, 2, ..., N) from among the N modulating units $42_1$ to $42_N$ and supplies the selected modulating unit $42_n$ with a signal output by the selecting unit 17 (FIG. 4).

In accordance with a signal supplied from the selecting unit 41, the modulating unit $42_n$ modulates the carrier, which is a current flowing in the antenna 11 after passing through the selecting unit 43, so that data transmission can be performed at the n-th transfer rate.

At this time, the modulating unit $42_n$ and a modulating unit $42_{n'}$, ($n \neq n'$) modulate the carrier at different transfer rates. Accordingly, the modulating unit 19 in FIG. 6 can transmit data at N transfer rates from the first to N-th. As the N transfer rates, transfer rates identical to those at which demodulation can be performed by the demodulating unit 13 in FIG. 5 can be employed.

Under the control of the control unit 21, the selecting unit 43 selects, from among the N modulating units $42_1$ to $42_N$, the same modulating unit $42_n$ selected by the selecting unit 41, and electrically connects the selected modulating unit $42_n$ and the antenna 11.

In the modulating unit 19 having the above-described configuration, the control unit 21 (FIG. 4) controls, for example, the selecting unit 41 to sequentially selects the N modulating units $42_1$ to $42_N$, whereby each of the modulating units $42_1$ to $42_N$ is controlled to modulate a carrier, which is a current flowing in the antenna 11 after passing through the selecting unit 43, in accordance with a signal supplied from the selecting unit 41.

Accordingly, the modulating unit 19 can transmit data by modulating the carrier so that data can be transmitted at an arbitrary rate among the N transfer rates.

Since the load modulation unit 20 in FIG. 4 is similar in configuration to, for example, the modulating unit 19 in FIG. 6, its description is omitted.

As described above, the NFC communication apparatuses 1 to 3 can modulate a carrier to generate a signal of data transmitted at one of N transfer rates, and can demodulate the signal of data transmitted at one of N transfer rates. The N transfer rates can include, for example, transfer rates already employed for near field communication, such as the existing IC card system (Felica method, etc.), as described above, and other transfer rates. Accordingly, among the NFC communication apparatuses 1 to 3, one can exchange data with another at any transfer rate among the N transfer rates. Moreover, according to the NFC communication apparatuses 1 to 3, data can be exchanged even between an IC card and a reader/writer which are included in the existing IC card system at a transfer rate employed by the IC card or reader/writer.

As a result, even if the NFC communication apparatuses 1 to 3 are introduced into a service employing the existing near field communication, users do not become confused, etc. Therefore, the introduction can be easily performed. In addition, the NFC communication apparatuses 1 to 3 can be easily introduced even to a service which employs a high-data-rate near field communication expected to appear in the future, while achieving coexistence with the existing near field communication.

Also, the NFC communication apparatuses 1 to 3 can perform data transmission, not only in a passive mode employed in conventional near field communication, but also in an active mode in which they transmit data by outputting electromagnetic waves. Thus, exchange of data can be directly performed, even if another apparatus, such as a reader/writer, is not used.

Figure 7:
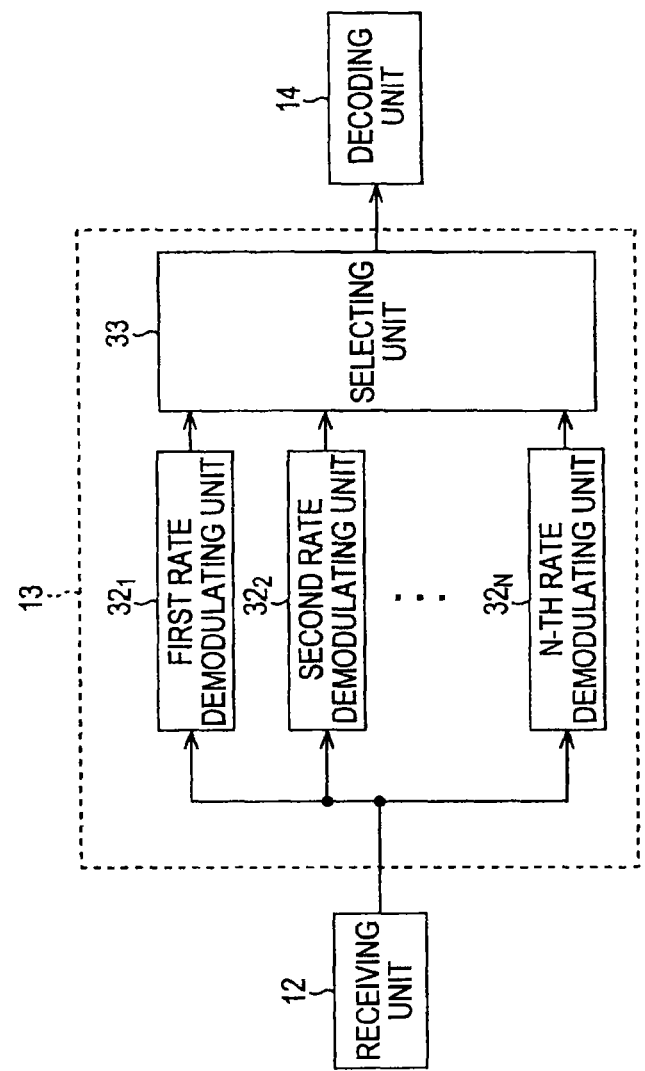
FIG. 7 is a block diagram showing another example of the demodulating unit 13.

Next, FIG. 7 shows another example of the demodulating unit 13 in FIG. 4. In FIG. 7, portions corresponding to those in the case of FIG. 5 are denoted by identical reference numerals, and their descriptions are omitted, if needed. Specifically, the demodulating unit 13 in FIG. 7 is basically similar to that in the case of FIG. 5, excluding a point in which the selecting unit 31 is not provided.

In other words, in the embodiment in FIG. 7, the signal output by the receiving unit 12 is simultaneously supplied to the demodulating units $32_1$ to $32_N$, and the signal from the receiving unit 12 is simultaneously demodulated by the demodulating units $32_1$ to $32_N$. The control unit 21 recognizes, for example, the demodulating unit $32_n$, which has successfully performed normal demodulation of the signal from the receiving unit 12, and controls the selecting unit 33 so that the demodulating unit $32_n$ performs output. Under the control of the control unit 21, the selecting unit 33 selects the demodulating unit $32_n$, whereby the normally demodulated output by the demodulating unit $32_n$ is supplied to the decoding unit 14.

In the embodiment in FIG. 7, it is required that the demodulating units $32_1$ to $32_N$ always perform demodulating operations. Conversely, in the embodiment in FIG. 5, among the demodulating units $32_1$ to $32_N$, only one selected by the selecting unit 31 can perform a demodulating operation, and the other ones can stop their operations. Accordingly, from an apparatus-power-consumption saving viewpoint, the configuration in FIG. 5 is more advantageous compared with FIG. 7. Alternatively, from a viewpoint of obtaining a normal demodulated output, the configuration in FIG. 7 is more advantageous compared with FIG. 5.

Figure 8:
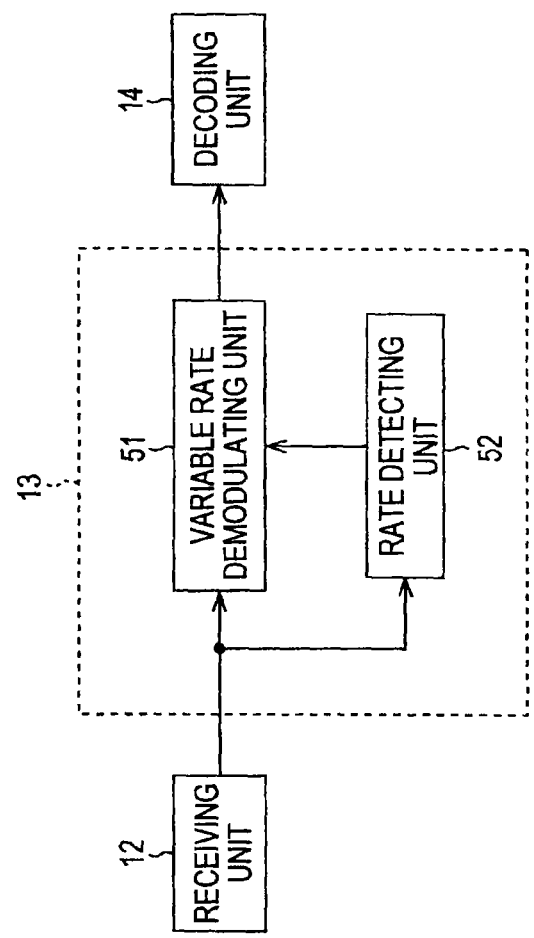
FIG. 8 is a block diagram showing an example of still another example of the demodulating unit 13.

Next, FIG. 8 shows still another example of the demodulating unit 13 in FIG. 4.

In FIG. 8, the demodulating unit 13 includes a variable rate demodulating unit 51 and a rate detecting unit 52.

The variable rate demodulating unit 51 demodulates the signal supplied from the receiving unit 12, as a signal having a transfer rate in accordance with an instruction from the rate detecting unit 52, and supplies the demodulation result to the decoding unit 14. The rate detecting unit 52 detects the transfer rate of the signal supplied from the receiving unit 12, and instructs the variable rate demodulating unit 51 to demodulate the signal having the transfer rate.

In the demodulating unit 51 having the above-described configuration, the signal output by the receiving unit 12 is supplied to the variable rate demodulating unit 51 and the rate detecting unit 52. The rate detecting unit 52 performs detection about to which one of the N transfer rates from the first to the N-th the transfer rate of the signal supplied from the receiving unit 12 is, and instructs the variable rate demodulating unit 51 to demodulate the signal having the detected transfer rate. The variable rate demodulating unit 51 demodulates the signal supplied from the receiving unit 12, as a signal having a transfer rate in accordance with an instruction from the rate detecting unit 52, and supplies the demodulation result to the decoding unit 14.

Next, each of the NFC communication apparatuses 1 to 3 can become an initiator that initiates communication by initially outputting electromagnetic waves. In the active mode, the NFC communication apparatuses 1 to 3 output electromagnetic waves by themselves, even if they become initiators or targets.

Therefore, when the NFC communication apparatuses 1 to 3 are close to one another, and among them, at least two apparatuses output electromagnetic waves, collision occurs, so that communication cannot be performed.

Accordingly, each of the NFC communication apparatuses 1 to 3 detects the existence of (an RF field caused by) electromagnetic waves from another apparatus. Only when the electromagnetic waves do not exist does the NFC communication apparatus initiate electromagnetic waves. This can prevent collision. Here, processing that performs detecting the existence of electromagnetic waves from another apparatus, and, only when the electromagnetic waves do not exist, initiating output of electromagnetic waves is called RFCA (RF Collision Avoidance) processing from a purpose of preventing collision.

The RFCA processing includes two types, initial RFCA processing that is initially performed by an NFC communication apparatus (one or more of the NFC communication apparatuses 1 to 3 in FIG. 1), which will become an initiator, and response RFCA processing that is performed during communication in the active mode by an NFC communication apparatus for initiating output of electromagnetic waves whenever the NFC communication apparatus initiates the output. Both the initial RFCA processing and the response RFCA processing are identical to each other in that an apparatus detects the existence of electromagnetic waves caused by another apparatus before the apparatus initiates output of electromagnetic waves, and, only when the electromagnetic waves do not exist does the apparatus initiate the output of the electromagnetic waves. However, the initial RFCA processing and the response RFCA processing differ from each other in points such as a time, from a state in which the existence of the electromagnetic waves caused by the other apparatus is not detected, to timing with which the output of electromagnetic waves must be initiated.

Accordingly, the initial RFCA processing is described with reference to FIG. 9.

Figure 9:
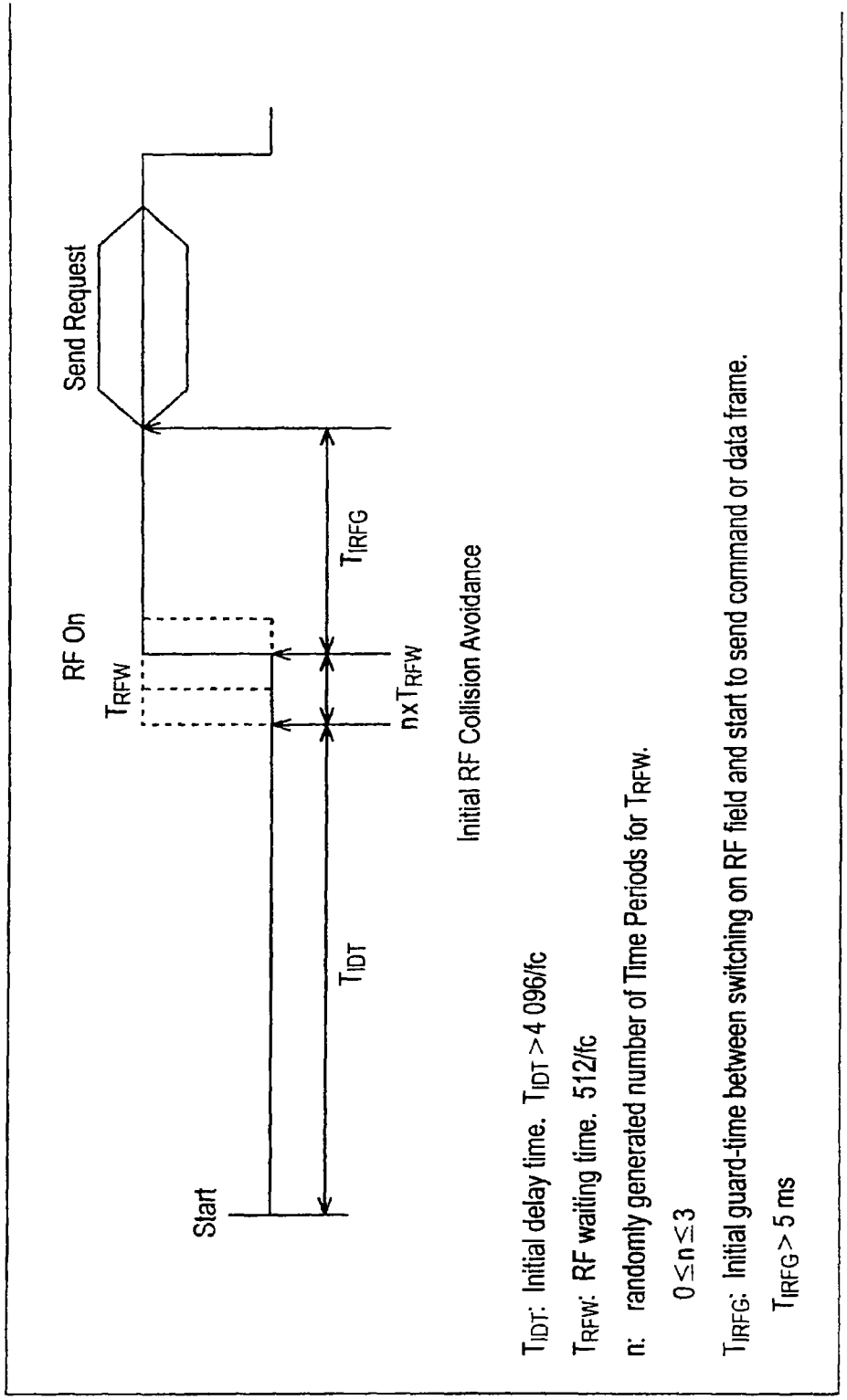
FIG. 9 is a timing chart illustrating initial RFCA processing.

FIG. 9 shows electromagnetic waves in which output of the electromagnetic waves is initiated by the initial RFCA processing. In FIG. 9 (similarly in FIG. 10, which is described later), the horizontal axis indicates a time, and the vertical axis indicates the level of electromagnetic waves output by an NFC communication apparatus.

An NFC communication apparatus which will become an initiator always detects electromagnetic waves caused by another apparatus. When the electromagnetic waves caused by the other apparatus are not consecutively detected during time $T_{IDT}+n \times T_{RFW}$, the apparatus initiates output of electromagnetic waves, and initiates transmission (Send Request) of data (including a command) after at least time $T_{IRFG}$ elapses from the output.

Here, $T_{IDT}$ in time $T_{IDT}+n \times T_{RFW}$ is called an initial delay time. When the frequency of a carrier is represented by $f_c$, for example, a value greater than $4096/f_c$ is employed. n is, for example, an integer which is not less than 0 and not greater than 3, and is generated by using random numbers. $T_{RFW}$ is called an RF waiting time, and, for example, $512/f_c$ is employed. Time $T_{IRFG}$ is called an initial guard-time, and, for example, a value greater than 5 ms is employed.

By employing n, which is a random number, to time $T_{IDT}+n \times T_{RFW}$ in which electromagnetic waves must not be detected, a possibility that a plurality of NFC communication apparatuses may initiate output of electromagnetic waves with the same timing is achieved.

When an NFC communication apparatus uses initial RFCA processing to initiate output of electromagnetic waves, the NFC communication apparatus becomes an initiator. Then, when the active mode is set as a communication mode, the NFC communication apparatus which becomes the initiator ends transmission of data of itself, and subsequently ends output of the electromagnetic waves. Alternatively, when the passive mode is set as a communication mode, the NFC communication apparatus which becomes the initiator still continues the output of the electromagnetic waves which is initiated by the initial RFCA processing until it completes communication with a target.

Figure 10:
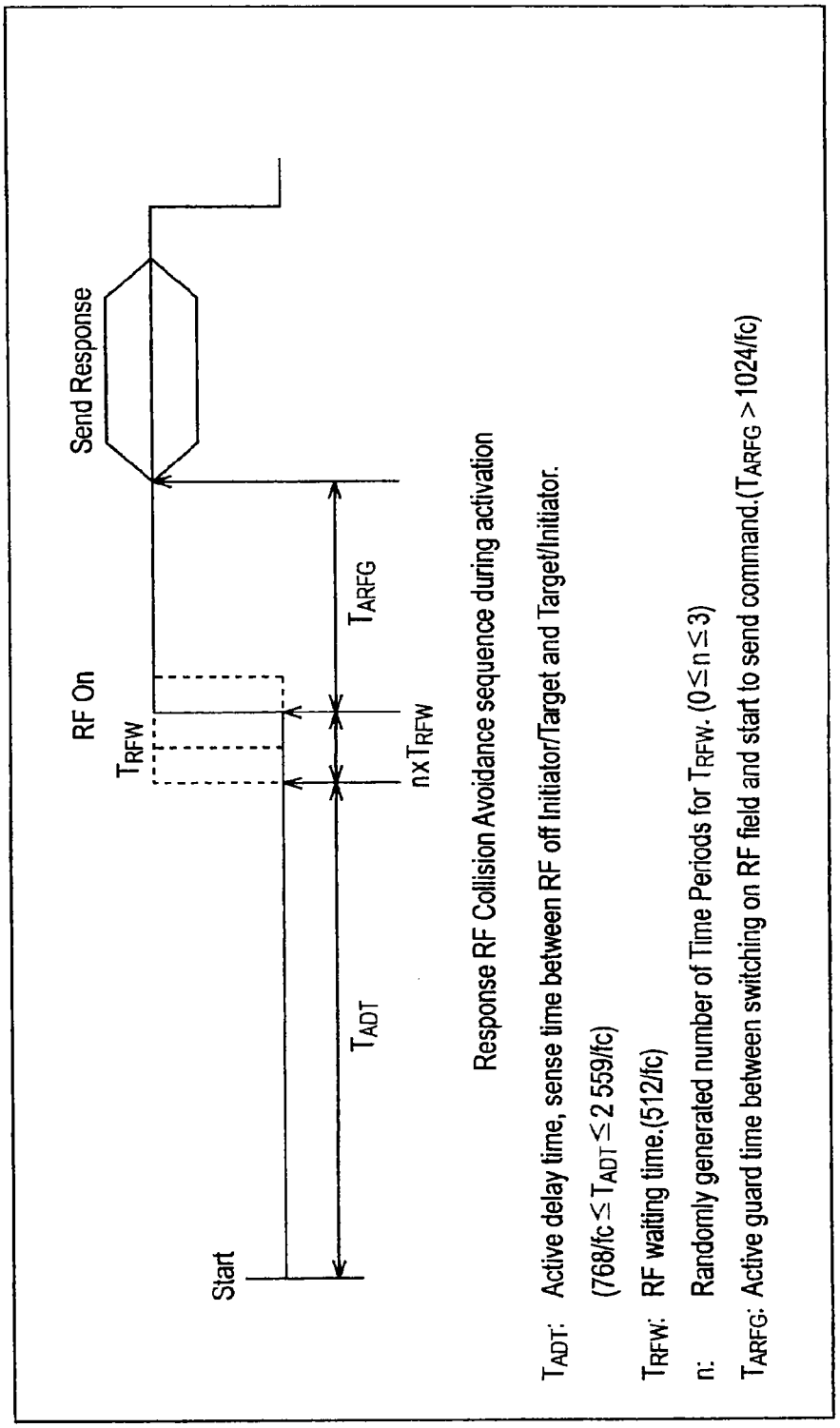
FIG. 10 is a timing chart illustrating active RFCA processing.

Next, FIG. 10 shows electromagnetic waves in which output of electromagnetic waves is initiated by response RFCA processing.

An NFC communication apparatus which will output electromagnetic waves in the active mode detects electromagnetic waves caused by another apparatus. When the electromagnetic waves caused by the other apparatus are consecutively not detected during time $T_{ADT}+n \times T_{RFW}$, the NFC communication apparatus initiates output of electromagnetic waves, and initiates transmission (Send Responses) of data after at least time $T_{ARFG}$ elapses from the output.

Here, n and $T_{RFW}$ in time $T_{ADT}+n \times T_{RFW}$ are equal to those in the initial RFCA processing in FIG. 9. Also, $T_{ADT}$ in $T_{ADT}+n \times T_{RFW}$ is called an active delay time, and, for example, a value that is not less than $768/f_c$ and not greater than $2559/f_c$ is employed. Time $T_{ARFG}$ is called an active guard time, and, for example, a value greater than $1024/f_c$ is employed.

As is clear from FIG. 9 and FIG. 10, in order to initiate output of electromagnetic waves by initial RFCA processing, electromagnetic waves must not exist during at least the initial delay time $T_{IDT}$. In order to initiate output of electromagnetic waves by response RFCA processing, electromagnetic waves must not exist during at least the active delay time $T_{ADT}$.

The initial delay time $T_{IDT}$ is a value greater than $4096/f_c$, while the active delay time $T_{ADT}$ is a value that is not less than $768/f_c$ and not greater than $2559/f_c$. Thus, when an NFC communication apparatus will become an initiator, a state in electromagnetic waves do not exist is required for a time longer than that in the case of outputting electromagnetic waves in communication in the active mode. Conversely, when an NFC communication apparatus will output electromagnetic waves in communication in the active mode, the NFC communication apparatus must output electromagnetic waves without having so longer time, compared with the case of becoming the initiator, after the state in which the electromagnetic waves do not exist occurs. This is because of the following reason. In other words, when NFC communication apparatuses perform communication in the active mode, one NFC communication apparatus transmits data by outputting electromagnetic waves by itself, and subsequently stops outputting the electromagnetic waves. The other NFC communication apparatus initiates output of electromagnetic waves and transmits data. Thus, in the communication in the active mode, either NFC communication apparatus may stop outputting electromagnetic waves. Accordingly, when an NFC communication apparatus will become an initiator, in order to confirm that no active mode communication is not being performed around the NFC communication apparatus, it is necessary to confirm, for a sufficient time, that another apparatus outputs no electromagnetic waves around the NFC communication apparatus that will become the initiator.

Conversely, in the active mode, as described above, an initiator outputs electromagnetic waves, whereby data is transmitted to a target. After the initiator stops outputting the electromagnetic waves, the target initiates output of electromagnetic waves, whereby data is transmitted to the target. After that, the initiator initiates output of electromagnetic waves after the target stops outputting the electromagnetic waves, whereby data is transmitted to the initiator. Subsequently, data is similarly exchanged between the initiator and the target.

Therefore, when an NFC communication apparatus that will become an initiator exists around an initiator and a target which communicate with each other in the active mode, if there is a long time after one of the initiator and the target which communicate with each other in the active mode stops outputting electromagnetic waves until the other one initiates output of electromagnetic waves, no electromagnetic waves exist during the time. Thus, the NFC communication apparatus that will become the initiator initiates output of electromagnetic waves by initial RFCA processing. In this case, the already performed active mode communication is hindered.

Accordingly, in the response RFCA processing, which is performed in the active mode communication, electromagnetic waves must be output without an elapse of a time after a state in which electromagnetic waves do not exist occurs.

Next, the NFC communication apparatus that will become the initiator initiates output of electromagnetic waves by the initial RFCA processing, and subsequently transmits data, as described with reference to FIG. 9. The NFC communication apparatus that will become the initiator becomes the initiator by initiating output of electromagnetic waves, and an NFC communication apparatus existing at a position close to the initiator becomes a target. In order for the initiator to exchange data with the target, the target exchanging the data must be identified. Accordingly, after initiating output of the electromagnetic waves by the initial RFCA processing, the initiator requests an NFCID (NFC Identification) as information identifying each target from at least one target existing at a position close to the initiator. The target existing at the position close to the initiator transmits, to the initiator, NFCID identifying itself in response to a request from the initiator.

The initiator identifies the target based on the NFCID transmitted from the target, as described above, and exchanges data with the identified target. Processing in which an initiator identifies a target existing around (at a position close to) the initiator based on NFCID of the target is called SDD (Single Device Detection) processing.

In the SDD processing, the initiator requests NFCID of the target, and the requesting is performed such that the initiator transmits a frame called a polling request frame. When receiving the polling request frame, the target determines, for example, NFCID based on random numbers, and transmits a frame in which the NFCID is located and which is called a polling response frame. The initiator recognizes the NFCID of the target by receiving the polling response frame transmitted from the target.

In addition, when the initiator requests NFCIDs from targets around it, if plural targets exist around the initiator, two or more of the plural targets may simultaneously transmit their NFCIDs. In this case, the NFCIDs transmitted from the two or more targets collide with one another, so that the initiator cannot recognize the colliding NFCIDs.

Accordingly, the SDD processing is performed, for example, by a method using time slots in order to avoid collision of NFCIDs as much as possible.

Figure 11:
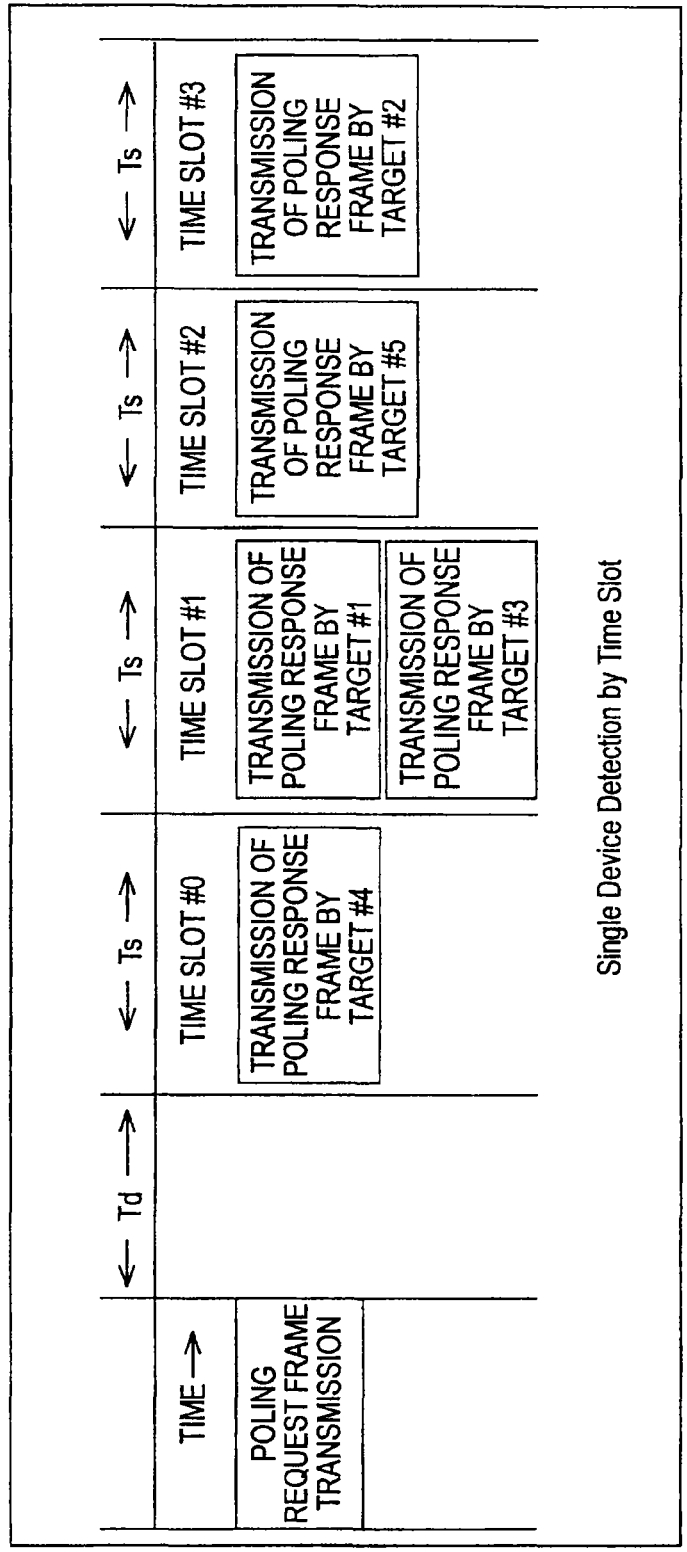
FIG. 11 is an illustration of SDD processing.

In other words, FIG. 11 shows an SDD processing sequence performed by a method using time slots. In FIG. 11, it is assumed that five targets #1, #2, #3, #4, and #5 exist around an initiator.

In the SDD processing, the initiator transmits the polling response frame. After completion of the transmission, time slots at intervals of predetermined time $T_S$ are set. Time $T_d$ is set to, for example, $512 \times 64/f_c$, and time $T_S$ as the time slot interval is set to, for example, $256 \times 64/f_c$. Also, the time slots are sequentially (integer) numbered from zero from, for example, the temporally preceding slot, whereby they are identified.

Although FIG. 11 shows four time slots #0, #1, #2, and #3, for example, up to sixteen time slots can be set. The number TSN of time slots, set for a certain polling response frame, is designated by the initiator, and is transmitted to a target in a form included in the polling response frame.

The target receives the polling response frame transmitted from the initiator, and recognizes the number TSN of time slots. The target uses random numbers to generate integer R in the range of not less than zero to TSN−1, and transmits a polling response frame in which its NFCID is located, with timing of time slot #R determined by the integer R.

As described above, based on random numbers, a target determines time slots used as timing for transmitting polling response frames. Thus, timing with which the targets transmit polling response frames varies. This can avoid collision of the polling response frames transmitted by the targets as much as possible.

Even if each target determines, based on random numbers, a time slot as timing for transmitting a polling response frame, time slots in which polling response frames are transmitted by the targets coincide with one another. This may cause collision of the polling response frames. In the embodiment in FIG. 11, a polling response frame of target #4 is transmitted in time slot #0, polling response frames of targets #1 and #3 are transmitted in time slot #1, a polling response frame of target #5 is transmitted in time slot #2, and a polling response frame of target #3 is transmitted, so that the collision between targets #1 and #3 occurs.

In this case, the initiator cannot normally receive the polling response frames of targets #1 and #3 between which the collision occurs. Accordingly, the initiator transmits a polling request frame again. This requests targets #1 and #3 to transmit polling response frames in which their NFCIDs are located. Subsequently, until the initiator recognizes all the NFCIDs of targets #1 to #5 around it, transmission of polling request frames by the initiator and transmission of polling response frames by the targets are repeatedly performed.

In a case in which, when the initiator transmits a polling request frame again, all the targets #1 to #5 can send back polling response frames, there is a possibility that two polling response frames may collide with each other. Accordingly, in a case in which, after each target receives a polling request frame from the initiator, the target receives a polling request frame again without taking much time, for example, the target can ignore the polling request frame. However, in this case, in the embodiment in FIG. 11, regarding targets #1 and #3, in which polling response collision occurs for the initially transmitted polling request frame, the initiator cannot recognize the NFCIDs of targets #1 and #3. Thus, data exchange cannot be performed between targets #1 and #3.

Accordingly, targets #2, #4, and #5, in which their polling response frames are normally received and their NFCIDs can be recognized, are temporarily excluded from parties among which communication is performed, whereby a polling response frame as a response to the polling request frame cannot be sent back. In this case, those which send back polling response frames to the polling request frame re-transmitted by the initiator are only targets #1 and #3, whose NFCIDs cannot be recognized through the transmission of the initial polling request frame. Therefore, in this case, all the NFCIDs of targets #1 to #5 can be recognized while reducing a possibility that polling response frames may collide with each other.

In addition, here, when receiving a polling request frame, as described above, the target determines (generates) its NFCID based on random numbers. Accordingly, from different targets, polling response frames with identical NFCIDs located therein may be transmitted to the initiator. When the initiator receives, in different time slots, the polling response frames with identical NFCIDs located therein, the initiator can re-transmit a polling request frame, for example, similarly to a case in which polling response frames collide with each other.

As described above, according to NFC communication apparatuses, even between an IC card and a reader/writer constituting the existing IC card system, data can be exchanged at transfer rates employed by the IC card and the reader/writer. When a target is, for example, an IC card in the existing IC card system, SDD processing is performed in, for example, the following manner.

Specifically, an initiator uses the initial RFCA processing to initiate electromagnetic waves, and an IC card as a target obtains power from the electromagnetic waves and initiates processing. In other words, in this case, the target generates operating power from the electromagnetic waves output by the initiator since it is an IC card in the existing IC card system.

After obtaining the power and being operable, the target prepares for receiving a polling request frame within, for example, a maximum of 2 seconds, and waits for the polling request frame to be transmitted from the initiator.

In addition, the initiator can transmit a polling request frame regardless of whether or not the preparation for receiving the polling request frame is completed in the target.

When the target receives the polling request frame from the initiator, as described above, it transmits a polling response frame to the initiator with timing of a predetermined time slot. When the initiator successfully receives the polling response frame from the target, as described above, it recognizes the NFCID of the target. Also, when the initiator fails to normally receive the polling response frame from the target, it can re-transmit a polling request frame.

In this case, the target generates operating power from electromagnetic waves output by the initiator since it is an IC card in the existing IC card system. Accordingly, the initiator continues to the electromagnetic wave output initiated by the initial RFCA processing until communication with the target completely ends.

Next, according to NFC communication apparatuses, communication is performed such that an initiator transmits a command to a target, and the target transmits (sends back) a response to the command from the initiator.

Accordingly, FIG. 12 shows commands that the initiator transmits to the target, and responses that the target transmits to the initiator.

In FIG. 12, those having the characters REQ after the underbar (_) represent commands, and those having the characters RES after the underbar (_) represent responses. In the embodiment in FIG. 12, six types of commands, ATR_REQ, WUP_REQ, PSL_REQ, DEP_REQ, DSL_REQ, and RLS_REQ, are available. Similarly to the commands, also six types of responses, ATR_RES, WUP_RES, PSL_RES, DEP_RES, DSL_RES, and RLS_RES, are available. As described above, an initiator transmits a command (request) to a target, and the target transmits to the initiator a response to the command. Accordingly, the command is transmitted by the initiator, and the response is transmitted by the target.

The command ATR_REQ is such that the initiator notifies the target of its attributes (specifications) and is transmitted to the target when the initiator requests target's attributes. Here, the attributes of the initiator or the target include the transfer rate of data that can be transmitted or received by the initiator or the target. In the command ATR_REQ, in addition to initiator's attributes, an NFCID identifying the initiator is located, and the target recognizes the initiator's attributes and NFCID by receiving the ATR_REQ.

The response ATR_RES is transmitted as a response to the command ATR_REQ to the initiator when the target receives the command ATR_REQ. In the response ATR_RES, attributes, an NFCID, etc., of the target are located.

Transfer rate information as an attribute located in the command ATR_REQ and the response ATR_RES can include all the transfer rates of data items which can be transmitted and received by the initiator and the target. In this case, by exchanging the command ATR_REQ and the response ATR_RES once between the initiator and the target, the initiator can recognize a transfer rate at which the target can perform transmission and reception, and the target can also recognize a transfer rate at the initiator can perform transmission and reception.

The command WUP_REQ is transmitted when the initiator selects a target with which the initiator will communicate. Specifically, by transmitting the command DSL_REQ, which is described later, from the initiator to the target, the target can set to be in a deselect state (a state in which transmission (response) of data to the initiator is prohibited). The command WUP_REQ is transmitted in the case of releasing the deselect state and setting the target to be in a state capable of transmitting data to the initiator. In the command WUP_REQ, the NFCID of the target whose deselect state is to be released is located. Among targets which receive the command WUP_REQ, a target which is identified by the NFCID located in the received command WUP_REQ releases its deselect state.

When, among the targets which receive the command WUP_REQ, the target which is identified by the NFCID located in the received command WUP_REQ releases its deselect state, the response WUP_RES is transmitted as a response to the command WUP_REQ.

The command PSL_REQ is transmitted when the initiator changes communication parameters concerning communication with the target. Here, the communication parameters include, for example, the transfer rate of data exchanged between the initiator and the target.

The command PSL_REQ includes a changed communication parameter located therein, and is transmitted from the initiator to the target. The target receives the command PSL_REQ, and changes its communication parameter in accordance with the communication parameter located in the command. The target further transmits the response PSL_RES to the command PSL_REQ.

The command DEP_REQ is transmitted when the initiator performs transmission and reception (data exchange with the target) of data (so-called real data). In this command, data to be transmitted to the target is located. The response DEP_RES is transmitted as a response to the command DEP_REQ. In this command, data to be transmitted to the initiator is located. Accordingly, the command DEP_REQ transmits data from the initiator to the target, and the response DEP_RES to the command DEP_REQ transmits data from the target to the initiator.

The command DSL_REQ is transmitted when the initiator sets the target to be in the deselect state. The target, which receives the command DSL_REQ, transmits the response DSL_RES to the command DSL_REQ before entering the deselect state, and subsequently becomes less responsive (comes to send back no response) to commands other than the command WUP_REQ.

The command RLS_REQ is transmitted when the initiator completely ends the communication with the target. The target, which received the command RLS_REQ, transmits the response RLS_RES to the command RLS_REQ, and completely ends the communication with the initiator.

Here, both the commands DSL_REQ and RLS_REQ are common in excluding a target from parties communicating with the initiator. However, the target excluded by the command DSL_REQ is set to be communicatable with the initiator again by the command WUP_REQ, while the target excluded by the command RLS_REQ does not become communicatable with the initiator unless exchange with the initiator of the above-described polling request frame and polling response frame is performed. In that point, the commands DSL_REQ and RLS_REQ differ from each other.

Exchange of a command and a response is performed in, for example, a transport layer.

Figure 13:
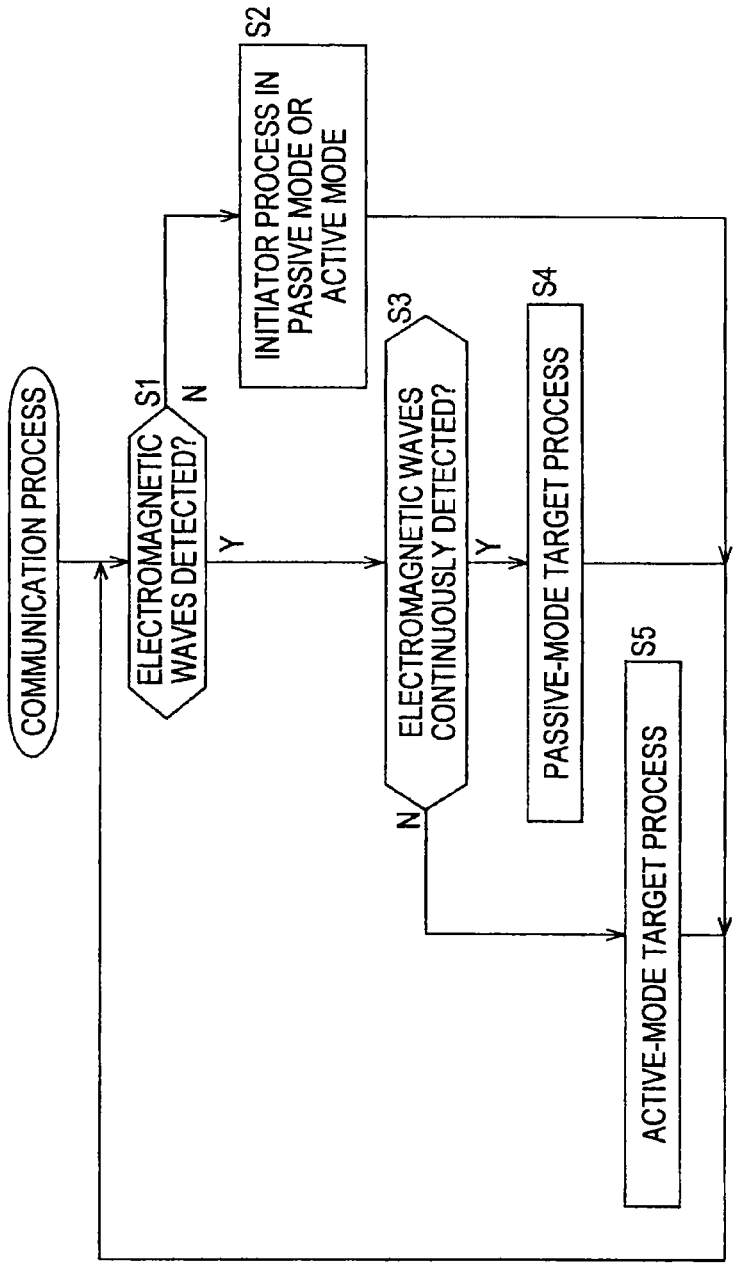
FIG. 13 is a flowchart illustrating a process of an NFC communication apparatus.

Next, a communication process of an NFC communication apparatus is described with reference to the flowchart in FIG. 13.

When initiating communication, in step S1, an NFC communication apparatus determines whether to have detected electromagnetic waves caused by another apparatus.

At this time, in the NFC communication apparatus (FIG. 4), for example, the receiving unit 12 monitors the level of a signal output to the demodulating unit 13 by the receiving unit 12. In step S1, based on the level, it is determined whether the electromagnetic waves caused by the other apparatus have been detected.

If the process has determined in step S1 that it has not detected the electromagnetic waves caused by the other apparatus, it proceeds to step S2. The NFC communication apparatus sets its communication mode to the passive mode or the active mode, and performs an initiator process in passive mode or an initiator process in active mode, which is described later. The NFC communication apparatus returns to step S1 after ending the process, and subsequently repeats similar processing.

Here, in step S2, the communication mode of the NFC communication apparatus may be set to either the passive mode or the active mode. However, when the target can be only a passive mode target such as an IC card in the existing IC card system, in step S2, the NFC communication apparatus needs to set its communication mode to the passive mode and to perform the initiator process in passive mode.

Alternatively, if it is determined that the electromagnetic waves caused by the other apparatus have been detected, that is, when the electromagnetic waves caused by the other apparatus have been detected around the NFC communication apparatus, the NFC communication apparatus proceeds to step S3, and determines whether the electromagnetic waves detected in step S1 have been continuously detected.

If the NFC communication apparatus has determined in step S3 that the electromagnetic waves have been continuously detected, it proceeds to step S4, and sets its communication mode to the passive mode and a target process in passive mode, which is described later. In other words, the continuous detection of the electromagnetic waves is, for example, a case in which another apparatus close to the NFC communication apparatus is an initiator in passive mode and continues to output electromagnetic waves in which the output of the electromagnetic waves is initiated by initial RFCA processing, so that the NFC communication apparatus becomes a target in passive mode and performs processing. After ending the processing, the NFC communication apparatus returns to step S1 and subsequently repeats similar processing.

Also, if the NFC communication apparatus has determined in step S3 that the electromagnetic waves have not been continuously detected, it proceeds to step S5, and the NFC communication apparatus sets its communication mode to the active mode and performs the target process in active mode, which is described later.

In other words, no continuous detection of the electromagnetic waves is, for example, a case in which another apparatus close to the NFC communication apparatus becomes an initiator in active mode and initiates electromagnetic waves by initial RFCA processing, and subsequently stops outputting the electromagnetic waves. Accordingly, the NFC communication apparatus becomes a target in active mode and performs processing. After ending the processing, the NFC communication apparatus returns to step S1 and subsequently repeats similar processing.

Next, the passive-mode initiator process by the NFC communication apparatus is described with reference to the flowchart in FIG. 14.

In the passive-mode initiator process, at first, in step S11, the NFC communication apparatus initiates output of electromagnetic waves. Step S11 in the passive-mode initiator process is performed when the electromagnetic waves have not been detected in step S1 in the above FIG. 13. In other words, when the electromagnetic waves have not been detected in step S1 in FIG. 13, the NFC communication apparatus initiates output of electromagnetic waves in step S11. Accordingly, processing in steps S1 and S11 corresponds to the above-described initial RFCA processing.

After that, proceeding to step S12, the NFC communication apparatus sets transmission-rate-representing variable n to, for example, an initial value of 1 before proceeds to step S13. In step S13, the NFC communication apparatus transmits a polling request frame at the n-th transfer rate (hereinafter referred to also as the n-th rate, if needed), and proceeds to step S14. In step S14, the NFC communication apparatus determines whether a polling response frame has been transmitted at the n-th rate from another apparatus.

In step S14, when it is determined that the polling response frame has not been transmitted from the other apparatus, that is, for example, when another apparatus close the NFC communication apparatus cannot perform communication at the n-th rate, and a polling response frame in response to the polling request frame transmitted at the n-th rate is not sent back, the NFC communication apparatus skips over steps S15 to S17 and proceeds to step S18.

Also, in step S14, when it is determined that a polling response frame has been transmitted at the n-th rate from the other apparatus, that is, for example, when another apparatus close to the NFC communication apparatus can perform communication at the n-th rate, and a polling response frame in response to the polling request frame transmitted at the n-th rate is sent back, the NFC communication apparatus proceeds to step S15, and recognizes the NFCID of a target in passive mode, with the other apparatus, which has sent back the polling response frame as the target, and recognizes the target to be communicatable at the n-th rate.

Here, after the NFC communication apparatus recognizes, in step S15, the NFCID of the passive mode target and the target to be communicatable at the n-th rate, it (temporarily) determines that the transfer rate between it and the target is the n-th rate, and performs communication with the target at the n-th rate unless the transfer rate is changed by the command PSL_REQ.

After that, proceeding to step S16, the NFC communication apparatus transmits the command DSL_REQ at the n-th rate to the target (passive mode target) corresponding to the NFCID recognized in step S15. After this sets the target to be in the deselect state so that the target does not respond to polling request frames which are subsequently transmitted, the NFC communication apparatus proceeds to step S17.

In step S17, the NFC communication apparatus receives the response DSL_RES which is sent back for the command DSL_REQ transmitted in step S16 from a target set to be in the deselect state by the command DSL_REQ, and proceeds to step S18.

In step S18, the NFC communication apparatus determines whether a predetermined time has elapsed since the transmission of the polling request frame at the n-th rate in step S13. Here, the predetermined time in step S18 can be a time of zero or greater.

If the NFC communication apparatus has determined in step S18 that the predetermined time has not elapsed since the transmission of the polling request frame at the n-th rate in step S13, it returns to step S13, and repeatedly performs processing in steps S13 to S18.

In this process, the processing in steps S13 to S18 is repeatedly performed, whereby the NFC communication apparatus can receive polling response frames transmitted with types of timing in different time slots, as illustrated by FIG. 11.

Alternatively, if the NFC communication apparatus has determined in step S18 that the predetermined time has elapsed since the transmission of the polling request frame at the n-th rate in step S13, it proceeds to step S19, and determines whether variable n is equal to its maximum value of N. If the NFC communication apparatus has determined that variable n is not equal to the maximum value N, that is, when variable n is less than the maximum value N, it proceeds to step S20 and allows variable n to be incremented by 1 before returning to step S13. Subsequently, processing in steps S13 to S20 is repeatedly performed.

Here, the processing in steps S13 to S20 is repeatedly performed, whereby the NFC communication apparatus transmits polling request frames at N transfer rates and receives polling response frames sent back at transfer rates.

Alternatively, if the NFC communication apparatus has determined in step S19 that variable N is equal to the maximum value N, that is, when the NFC communication apparatus transmits polling request frames at N N transfer rates and receives polling response frames sent back at transfer rates, it proceeds to step S21 and performs, as a passive mode initiator, its communication process (passive-mode-initiator communication process). This passive-mode-initiator communication process is described later.

After the passive-mode-initiator communication process ends, the NFC communication apparatus proceeds from step S21 to S22, and stops outputting the electromagnetic waves whose output is initiated in step S11, so that the process ends.

Next, the passive-mode-target process by the NFC communication apparatus is described with reference to the flow-chart in FIG. 15.

In the passive-mode-target process, at first, in step S31, the NFC communication apparatus sets variable n, which represents a transfer rate, to, for example, an initial value of 1, and proceeds to step S32. In step S32, the NFC communication apparatus determines whether a polling request frame has been transmitted at the n-th rate from another apparatus which serves as a passive mode initiator.

If the NFC communication apparatus has determined in step S32 that no polling request frame has been transmitted from the passive mode initiator, that is, when, for example, another apparatus close the NFC communication apparatus cannot perform communication at the n-th rate, and thus cannot transmit a polling request frame at the n-th rate, it proceeds to step S33 and the NFC communication apparatus determines whether variable n is equal to its maximum value of N. If the NFC communication apparatus has determined in step S33 that variable n is not equal to the maximum value N, that is, when variable n is less than the maximum value N, it proceeds to step S34 and allows variable n to be incremented by 1 before returning to step S32. Subsequently, processing in steps S32 to S34 is repeatedly performed.

Alternatively, if the NFC communication apparatus has determined in step S33 that variable n is equal to the maximum value N, it returns to step S1 and subsequently repeats the processing in steps S31 to S34. In other words, in this process, until a polling request frame which is transmitted at any one of the N transfer rates can be received, the processing in steps S31 to S34 is repeatedly performed.

If it is determined in step S32 that a polling request frame has been transmitted from a passive mode initiator, that is, when the NFC communication apparatus normally receives a polling request frame at the n-th rate, it proceeds to step S35, and the NFC communication apparatus determines that the transfer rate between initiators is the n-th rate, and generates its NFCID based on random numbers before proceeding to step S36. In step S36, the NFC communication apparatus transmits a polling response frame in which its NFCID is located, at the n-th rate, and proceeds to step S37.

Here, after the NFC communication apparatus transmits the polling response frame at the n-th rate in step S36, it performs communication at the n-th rate unless it is instructed to change the transfer rate such that the command PSL_REQ is transmitted from the passive mode initiator.

In step S37, the NFC communication apparatus determines whether the command DSL_REQ has been transmitted from the passive mode initiator, and has determined that the command has not been transmitted, it returns to step S37 and waits for the command DSL_REQ to be transmitted from the passive mode initiator.

Also, when it is determined in step S37 that the command DSL_REQ has been transmitted from the passive mode initiator, that is, when the NFC communication apparatus receives the command DSL_REQ, the NFC communication apparatus proceeds to step S38. It transmits the response DSL_RES to the command DSL_REQ, and enters the deselect state before proceeding to step S39.

In step S39, the NFC communication apparatus performs, as a passive mode target, its communication process (passive-mode-target communication process). After it ends the passive-mode-target communication process, the process ends. The passive-mode-target communication process is described later.

Next, the active-mode-initiator process by the NFC communication apparatus is described with reference to the flow-chart in FIG. 16.

Figure 14:
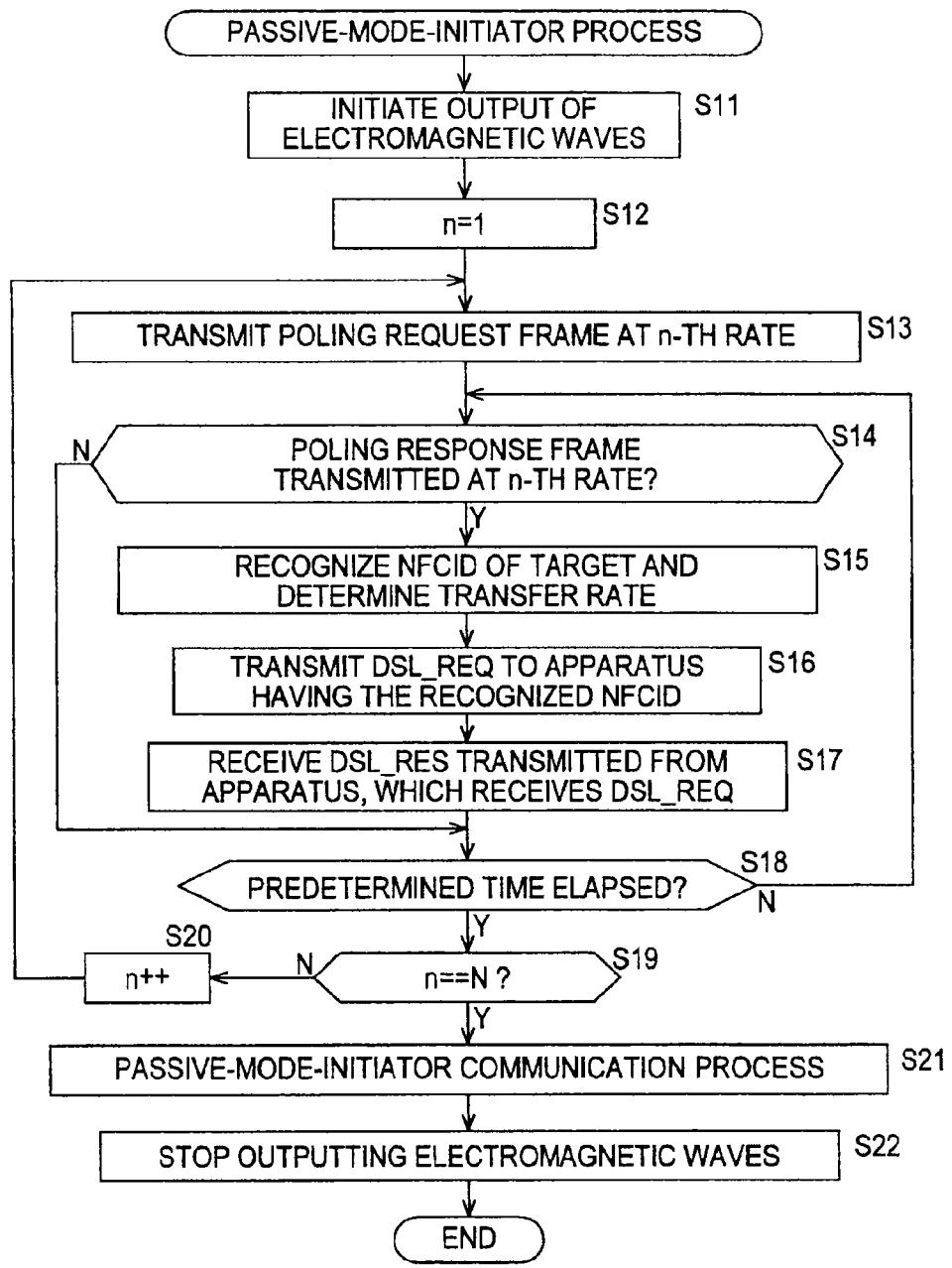
FIG. 14 is a flowchart showing a passive-mode-initiator process.

In the active-mode-initiator process, in each of steps S51 to S61, processing similar to that in each of steps S11 to S21 in the passive-mode initiator process in FIG. 14 is performed. In the passive-mode initiator process in FIG. 14, the NFC communication apparatus continues outputting electromagnetic waves until the process ends. The active-mode-initiator process differs in that only when the NFC communication apparatus transmits data does it output electromagnetic waves.

In other words, in step S51, the NFC communication apparatus initiates output of electromagnetic waves. Step S51 in the active-mode-initiator process is performed when, in step S1 in the above FIG. 13, the electromagnetic waves are not detected. Specifically, in step S1 in FIG. 13, the NFC communication apparatus initiates output of electromagnetic waves in step S51 when the electromagnetic waves are not detected. Accordingly, processing in steps S1 and S51 corresponds to the above initial RFCA processing.

After that, proceeding to step S52, the NFC communication apparatus sets variable n, which represents a transfer rate, to, for example, an initial value of 1, and proceeds to step S53. In step S53, the NFC communication apparatus transmits a polling request frame at the n-th rate and stops outputting the electromagnetic waves (hereinafter referred to also as performing RF-off process, if needed), and proceeds to step S54.

Here, in step S53, before transmitting the polling request frame, the NFC communication apparatus uses the above-described active RFCA processing to initiate the output of the electromagnetic waves. However, when variable n is the initial value of 1, the active RFCA processing does not need to be performed since the output of the electromagnetic waves has already been initiated by initial RFCA processing corresponding to the processing in steps S1 and S51.

In step S54, the NFC communication apparatus determines whether a polling response frame has been transmitted at the n-th rate from another apparatus.

When it is determined in step S54 that the polling response frame has not been transmitted from the other apparatus, that is, for example, when another apparatus close to the NFC communication apparatus cannot perform communication at the n-th rate, and a polling response frame to the polling request frame transmitted at the n-th rate is not sent back, the NFC communication apparatus skips over steps S55 to S57 and proceeds to step S58.

Also, when it is determined in step S54 that the polling response frame has been transmitted at the n-th rate from the other apparatus, that is, for example, when another apparatus close to the NFC communication apparatus cannot perform communication at the n-th rate, a polling response frame to the polling request frame transmitted at the n-th rate is sent back, the NFC communication apparatus proceeds to step S55. the NFC communication apparatus regards the other apparatus, which sends back the polling response frame, as an active mode target, recognizes the NFCID of the target based on an NFCID located in the polling response frame, and recognizes the target to be communicatable at the n-th rate.

When, in step S55, the NFC communication apparatus recognizes the NFCID of the active mode target and the target to be communicatable at the n-th rate, it determines that the transfer rate between it and the target is the n-th rate, and performs communication with the target at the n-th rate unless the transfer rate is changed by the command PSL_REQ.

After that, proceeding to step S56, the NFC communication apparatus initiates output of electromagnetic waves by the active RFCA processing, and transmits the command DSL_REQ at the n-th rate to the target (active mode target) having the NFCID recognized in step S55. This sets the target to be in a deselect state of not responding to polling response frames which are subsequently transmitted. After that, the NFC communication apparatus performs the RF-off processing, and proceeds from step S56 to S57.

In step S57, the NFC communication apparatus receives the response DSL_RES which is sent back for the command DSL_REQ transmitted in step S56 from the target set to be in the deselect state by the command DSL_REQ, and proceeds to step S58.

In step S58, the NFC communication apparatus determines whether a predetermined time has elapsed from the transmission of the polling request frame at the n-th rate in step S53.

When it is determined in step S58 that the predetermined time has not elapsed yet from the transmission of the polling request frame at the n-th rate in step S53, the process returns to step S53. Subsequently, processing in steps S53 to S58 is repeatedly performed.

Alternatively, when it is determined in step S58 that the predetermined time has elapsed from the transmission of the polling request frame at the n-th rate in step S53, the NFC communication apparatus proceeds to step S59 and determines whether variable n is equal to its maximum value of N. When it is determined in step S59 that variable n is not equal to the maximum value N, that is, when variable n is less the maximum value N, the NFC communication apparatus proceeds to step S60 and allows variable n to be incremented by 1 before returning to step S53. Subsequently, processing in steps S53 to S60 is repeatedly performed.

Here, the processing in steps S53 to S60, whereby the NFC communication apparatus transmits polling request frames at N transfer rates and receives polling response frames sent back at transfer rates.

Alternatively, when it is determined in step S59 that variable n is equal to the maximum value N, that is, when the NFC communication apparatus transmits polling request frames at N N transfer rates and receives polling response frames sent back at transfer rates, the NFC communication apparatus proceeds to step S61, performs, as an active mode initiator, its communication process (the active-mode-initiator communication process), and subsequently ends the process. This active-mode-initiator communication process is described later.

Next, an active-mode-target process by the NFC communication apparatus is described with reference to the flowchart in FIG. 17.

In the active-mode-target process, in each of steps S71 to S79, processing similar to the case of steps S31 to S39 in the passive-mode is performed. Although, in the passive-mode-target process in FIG. 15, the NFC communication apparatus transmits data by performing load modulation on the electromagnetic waves output by the passive mode initiator, the active-mode-target process differs in that the NFC communication apparatus transmits data by outputting electromagnetic waves by itself.

Figure 15:
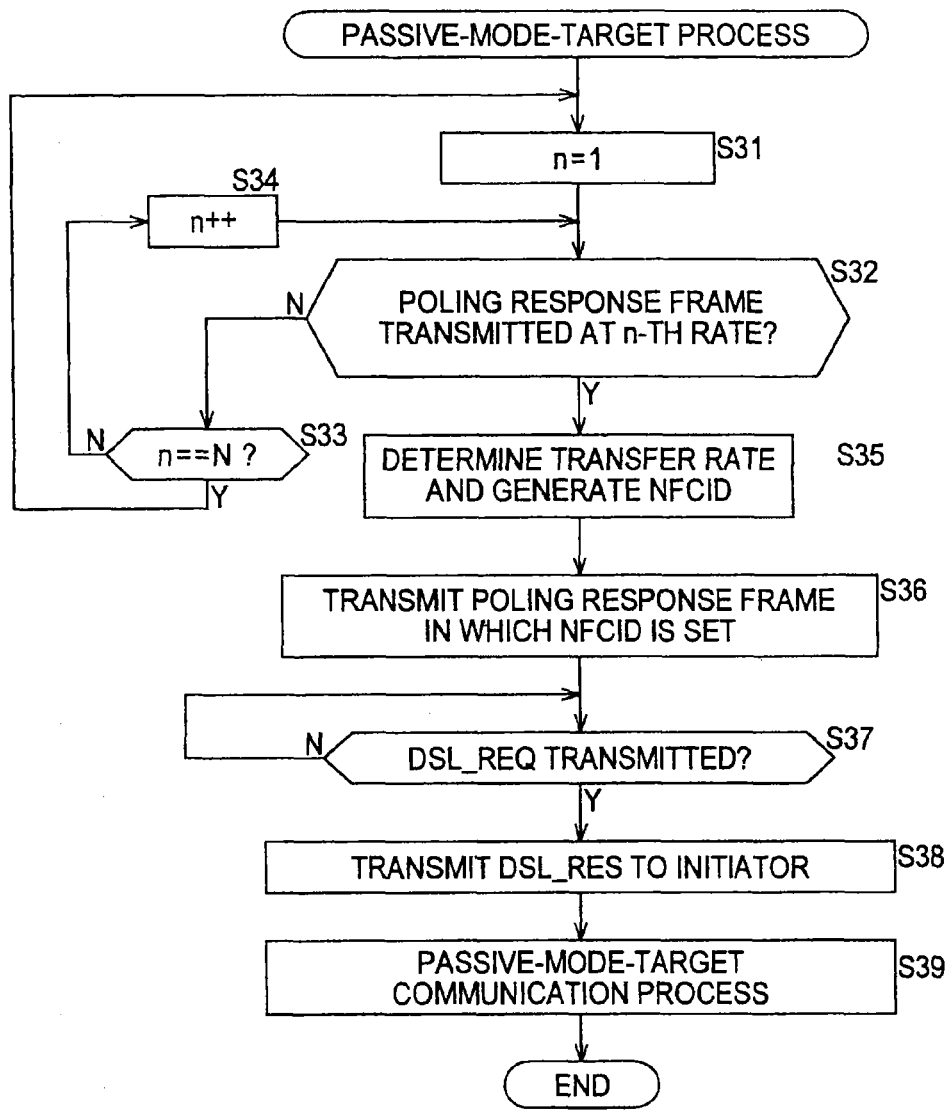
FIG. 15 is a flowchart showing a passive-mode-target process.

In other words, in the active-mode-target process, in each of steps S71 to S75, processing similar to the case of the steps S31 to S35 in FIG. 15 is performed.

After processing in step S75, the NFC communication apparatus proceeds to step S76, initiates output of electromagnetic waves by the active RFCA processing, and transmits a polling response frame in which its NFCID is located, at the n-th rate. In step S76, the NFC communication apparatus performs RF-off processing and proceeds to step S77.

Here, after transmitting the polling response frame at the n-th rate in step S76, the NFC communication apparatus performs communication at the n-th rate unless the command PSL_REQ is transmitted from the active-mode initiator to instruct the NFC communication apparatus to change the transfer rate.

In step S77, the NFC communication apparatus determines whether the command DSL_REQ has been transmitted from the active mode initiator. If the NFC communication apparatus has determined that the command has not been transmitted, it returns to step S77 and waits for the command DSL_REQ to be transmitted from the active mode initiator.

Alternatively, if the NFC communication apparatus has determined in step S77 that the command DSL_REQ has not been transmitted from the active mode initiator, that is, when the NFC communication apparatus has received the DSL_REQ, it proceeds to step S78, initiates output of electromagnetic waves by the active RFCA processing, and transmits the response DSL_RES to the command DSL_REQ. Also, in step S78, the NFC communication apparatus performs RF-off processing and becomes a deselect state before proceeding to step S79.

In step S79, the NFC communication apparatus performs, as an active mode target, its communication process (active-mode-target communication process). When the active-mode-target communication process ends, the NFC communication apparatus ends its process. The active-mode-target communication process is described later.

Next, the passive-mode-initiator communication process in the step S21 in FIG. 14 is described with reference to the flowcharts in FIG. 18 and FIG. 19.

The NFC communication apparatus, which is a passive mode initiator, selects an apparatus (hereinafter referred to as an apparatus of interest, if needed) with which it will communicate, from among the targets having NFCIDs recognized in step S15 in FIG. 14, and proceeds to step S92. In step S92, it transmits the command WUP_REQ to the apparatus of interest, whereby, by transmitting the command DSL_REQ in step S16 in FIG. 14, the deselect state of the apparatus of interest, which has been set to be in the deselect state, is released (hereinafter referred to as waked up, if needed).

Subsequently, after the NFC communication apparatus waits for the apparatus of interest to transmit the response WUP_RES to the command WUP_REQ, it proceeds from step S92 to S93 and receives the response WUP_RES before proceeding to step S94. In step S94, the NFC communication apparatus transmits the command ATR_REQ to the apparatus of interest. After the NFC communication apparatus waits for the apparatus of interest to transmit the response ATR_RES to the command ATR_REQ, it proceeds from step S94 to S95 and receives the response ATR_RES.

As described above, the NFC communication apparatus and the apparatus of interest exchange the command ATR_REQ, in which an attribute is located, and the response ATR_REQ, whereby the NFC communication apparatus and the apparatus of interest recognize a transfer rate at which both can communicate with each other.

After that, proceeding from step S95 to S96, the NFC communication apparatus transmits the command DSL_REQ to set the apparatus of interest to be in the deselect state. After the NFC communication apparatus waits for the apparatus of interest to transmit the response DSL_RES to the command DSL_REQ, it proceeds from step S96 to S97 and receives the response DSL_RES before proceeding to step S98.

In step S98, the NFC communication apparatus determines whether to have selected all the targets having NFCIDs recognized in step S15 in FIG. 14, as apparatuses of interest, in step S91. If the NFC communication apparatus has determined in step S98 that some targets have not been selected as apparatuses of interest yet, it returns to step S91, and select, as an apparatus of interest, one of the targets which have not been selected as apparatuses of interest yet. Subsequently, similar processing is repeated.

Alternatively, if the NFC communication apparatus has determined in step S98 that, in step S91, it has selected, as apparatuses of interest, all the targets having the NFCIDs recognized in step S15 in FIG. 14, that is, when the NFC communication apparatus exchanges the command ATR_REQ and the response ATR_RES with all the targets having the NFCIDs recognized, and this enables each target to recognize a communicatable transfer rate, etc., it proceeds to step S99. The NFC communication apparatus selects an apparatus (apparatus of interest) with which the NFC communication apparatus will communicate, from among the targets with which the NFC communication apparatus exchanges the command ATR_REQ and the response ATR_RES, and proceeds to step S100.

In step S100, the NFC communication apparatus transmits the command WUP_REQ, and this transmits the command DSL_REQ in step S96, whereby the apparatus of interest, which is set to be in the deselect state, is waked up. The NFC communication apparatus waits for the apparatus of interest to transmit the response WUP_RES to the command WUP_REQ, and proceeds from step S100 to S101. It receives the response WUP_RES thereto and proceeds to step S111 in FIG. 19.

In step S111, the NFC communication apparatus determines whether to change a communication parameter, such as a transfer rate, in the case of communicating with the apparatus of interest.

Figure 18:
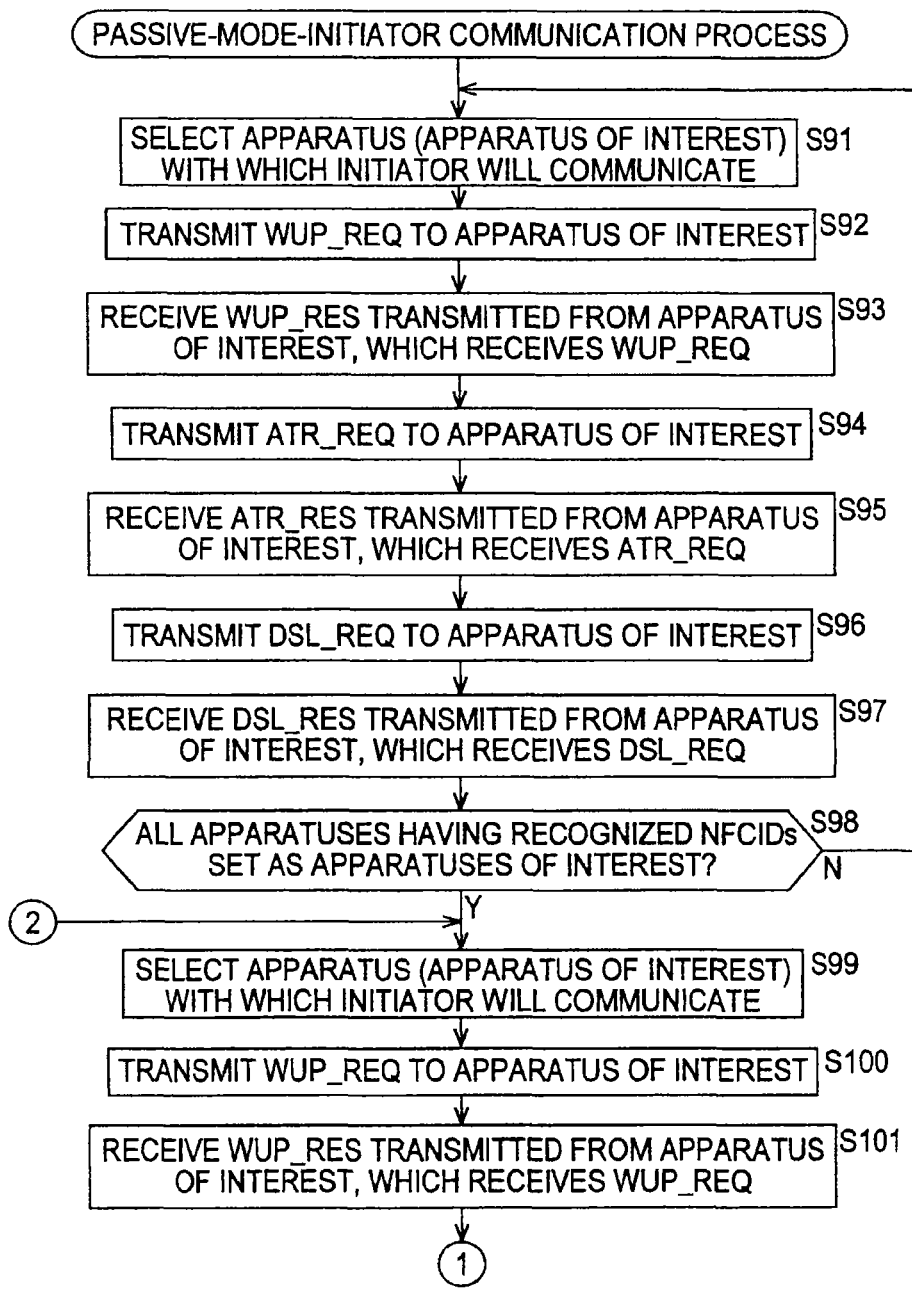
FIG. 18 is a flowchart showing a passive-mode-initiator communication process.

Here, the NFC communication apparatus has received the response ATR_RES in step S95 in FIG. 18, and recognizes, based on the attribute located in the response ATR_RES, the communication parameter such as a transfer rate at the apparatus of interest can perform communication. When the NFC communication apparatus can communicate with, for example, the apparatus of interest, at a transfer rate higher than the present transfer rate, it determines in step S111 to change the communication parameter in order to change the transfer rate to the higher transfer rate. Also, when the NFC communication apparatus can communicate with, the apparatus of interest, at a transfer rate lower than the present transfer rate, and the present communication environments have high noise level, the NFC communication apparatus determines in step S111 to change the communication parameter so that the transfer rate is changed to a lower transfer rate in order to lower transmission error. Even if communication is possible at a transfer rate different from the present transfer rate between the NFC communication apparatus and the apparatus of interest, the communication can be continued with the present transfer rate unchanged.

When it is determined in step S111 that the communication parameter in the case of communicating with the apparatus of interest, that is, when the communication is continued between the NFC communication apparatus and the apparatus of interest with the present communication parameter unchanged, the NFC communication apparatus skips over steps S112 to S114 and proceeds to step S115.

If the NFC communication apparatus has determined in step S111 to change the communication parameter in the case of communicating with the apparatus of interest, it proceeds to step S112, and locates the changed communication parameter in the command PSL_REQ, and transmits the command to the apparatus of interest. The NFC communication apparatus waits for the apparatus of interest to transmit the response PSL_RES to the command PSL_REQ before proceeding from step S112 to S113, and receives the response PSL_RES before proceeding to step S114.

In step S114, the NFC communication apparatus changes the communication parameter, such as the transfer rate in the case of communicating with the apparatus of interest, to the value of the communication parameter located in the command PSL_REQ transmitted in step S112. After that, the NFC communication apparatus communicates with the apparatus of interest in accordance with the communication parameter, such as the transfer rate changed in value in step S114 unless it exchanges the command PSL_REQ and the response PSL_RES.

According to the exchange (negotiation) of the command PSL_REQ and the response PSL_RES, in addition to the transfer rate, for example, the encoding method in the encoding unit 16 (the decoding unit 14), the modulating methods in the modulating unit 19 and the load modulation unit 20 (the demodulating unit 13), etc., can be changed.

After that, the NFC communication apparatus proceeds to step S115 and determines whether there is data to be transmitted to and received from the apparatus of interest. If it has determined that there is no data, it skips over steps S116 and S117 and proceeds to step S118.

If the NFC communication apparatus has determined in step S115 that there is data to be transmitted to or received from the apparatus of interest, it proceeds to step S116 and transmits the command DEP_REQ to the apparatus of interest. Here, in step S116, when there is data to be transmitted to the apparatus of interest, the NFC communication apparatus transmits the data in a form located in the command DEP_REQ.

The NFC communication apparatus waits for the apparatus of interest to transmit the response DEP_RES to the command DEP_REQ, proceeds from step S116 to S117, and receives the response DEP_RES before proceeding to step S118.

As described above, the command DEP_REQ and the response DEP_RES are exchanged between the NFC communication apparatus and the apparatus of interest, whereby transmission and reception of so-called real data are performed.

In step S118, the NFC communication apparatus determines to change the communication party. If the NFC communication apparatus has determined in step S118 not to change the communication party, that is, when there is still data to be exchanged with, for example, the apparatus of interest, it returns to step S111 and subsequently repeats similar processing.

Alternatively, if the NFC communication apparatus has determined in step S118 to change the communication party, that is, for example, when there is not data to be exchanged with the apparatus of interest, but there is data to be exchanged with another communication party, it proceeds to step S119 and transmits the command DSL_REQ or RLS_REQ to the apparatus of interest. the NFC communication apparatus waits for the apparatus of interest to transmit the response DSL_RES or RLS_RES to the command DSL_REQ or RLS_REQ, proceeds from step S119 to S120, and receives the response DSL_RES or RLS_RES.

As described above, the NFC communication apparatus transmits the command DSL_REQ or RLS_REQ to the apparatus of interest, whereby the target as the apparatus of interest is released from targeted apparatuses in communication with the NFC communication apparatus as the initiator. However, a target released by the command DSL_REQ is set to be communicatable with the initiator again by the command WUP_REQ, but a target released by the command RLS_REQ is not set to be communicatable with the initiator unless it exchanges the above polling request frame and polling response frame with the initiator.

Cases in which a certain target is released from targeted apparatuses in communication with the initiator include, not only a case in which, as described above, the command DSL_REQ or RLS_REQ is transmitted from the initiator to the target, but also, for example, a case in which near field communication cannot be performed since the initiator and the target are too far from each other. In this case, similarly to the target released by the command RLS_REQ, the target is not set to be communicatable with the initiator unless the target exchanges the above polling request frame and polling response frame with the initiator.

Here, release of a target which is not set to be communicatable with the initiator unless the target and the initiator exchange the polling request frame and the polling response frame is hereinafter referred to as complete release. Also, release of target which is set to be communicatable again with the initiator such that the command WUP_REQ is transmitted by the initiator is temporary release.

After processing in step S120, the NFC communication apparatus proceeds to step S121 and determines whether all the targets having the NFCIDs recognized in step S15 in FIG. 14 have been released. If the NFC communication apparatus has determined in step S121 that all the targets having the NFCIDs recognized in step S15 in FIG. 14 have not been released, it returns to step S99 in FIG. 18. The NFC communication apparatus selects a new apparatus of interest from among targets which have not been completely released, that is, targets which have temporarily released, and repeats similar processing.

If the NFC communication apparatus has determined in step S121 that all the targets having the NFCIDs recognized have been completely released, it ends the process.

Figure 19:
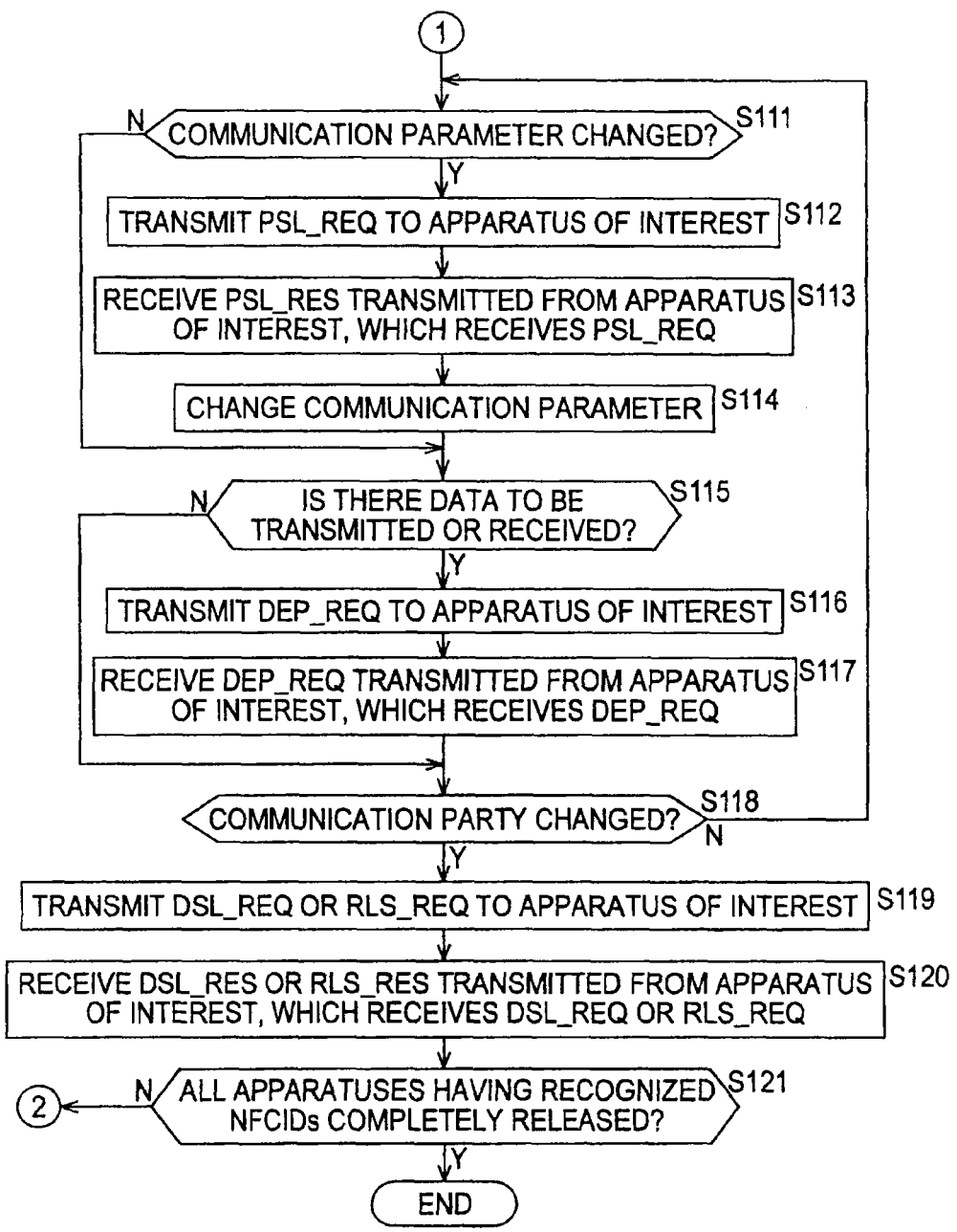
FIG. 19 is a flowchart showing a passive-mode-initiator communication process.

In steps S116 and S117 in FIG. 19, the command DEP_REQ and the response DEP_RES are exchanged, whereby transmission and reception (data exchange) of data are performed between the target and the initiator. This exchange of the command DEP_REQ and the response DEP_RES is one transaction. After processing in steps S116 and S117, the NFC communication apparatus can return to step S114 through steps S118, S111, S112, and S113, and can change the communication parameter. Accordingly, the communication parameter concerning the communication between the target and the initiator, such as the transfer rate, can be changed for each transaction.

In steps S112 and S113, the initiator and the target exchange the command PSL_REQ and the response PSL_RES, whereby, in step S114, a communication mode for the initiator and the target, which is one of communication parameters, can be changed. Accordingly, the communication mode for the target and the initiator can be changed for each transaction. This means that the communication mode for the target and the initiator must not be changed during one transaction.

Next, the passive-mode-target process in step S38 in FIG. 15 is described with reference to the flowchart in FIG. 20.

The NFC communication apparatus, which is a passive mode target, is in the deselect state since it exchanges the command DSL_REQ and the response DSL_RES with the initiator, which is in the passive mode, in steps S37 and S38 in FIG. 15.

Accordingly, in step S131, the NFC communication apparatus determines whether the command WUP_RES has been transmitted from the initiator. If it has determined that the command WUP_RES has not been transmitted, it returns to step S131, and remains unchanged in the deselect state.

Alternatively, if the NFC communication apparatus has determined in step S131 that the command WUP_REQ has been transmitted from the initiator, that is, when the NFC communication apparatus has received the command WUP_REQ, it proceeds to step S131, transmits the response WUP_RES to the command WUP_REQ, and is waked up before proceeding to step S133.

In step S133, the NFC communication apparatus determines whether the command ATR_REQ has been transmitted from the initiator. If it has determined that the above command has not been transmitted, it skips over step S134 and proceeds to step S135.

Alternatively, if the NFC communication apparatus has determined in step S133 that the command ATR_REQ has been transmitted from the initiator, that is, when the NFC communication apparatus has received the command ATR_REQ, it proceeds to step S135, and transmits the response ATR_RES to the command ATR_RES before proceeding to step S135.

In step S135, the NFC communication apparatus determines whether the command DSL_REQ has been transmitted from the initiator. If the NFC communication apparatus has determined in step S135 that the command DSL_REQ has been transmitted, that is, when the NFC communication apparatus has received the command DSL_REQ, it proceeds to step S136. The NFC communication apparatus transmits the response DSL_RES to the command DSL_REQ, and returns to step S131. This sets the NFC communication apparatus to be in the deselect state.

Alternatively, if the NFC communication apparatus has determined in step S135 that the command DSL_REQ has not been transmitted from the initiator, it proceeds to step S137. The NFC communication apparatus determines whether the command PSL_REQ has been transmitted from the initiator. If it has determined that the above command has not been transmitted, it skips over steps S138 and S139 and proceeds to step S140.

Alternatively, if the NFC communication apparatus has determined in step S137 that the command PSL_REQ has been transmitted from the initiator, that is, when the NFC communication apparatus has received the command PSL_REQ, it proceeds to step S138. The NFC communication apparatus transmits the response PSL_RES to the command PSL_RES, and proceeds to step S139.

In step S139, the NFC communication apparatus changes its communication parameter in accordance with the command PSL_REQ from the initiator, and proceeds to step S140.

In step S140, the NFC communication apparatus determines whether the command DEP_REQ has been transmitted from the initiator. If it has determined that the above command has not been transmitted, it skips over step S141 and proceeds to step S142.

Alternatively, if the NFC communication apparatus has determined in step S140 that the command DEP_REQ has been transmitted from the initiator, that is, when the NFC communication apparatus has received the command DEP_REQ, it proceeds to step S141. The NFC communication apparatus transmits the response DEP_RES to the command DEP_REQ, and proceeds to step S142.

In step S142, the NFC communication apparatus determines whether the command PSL_REQ has been transmitted from the initiator. If it has determined that the above command has not been transmitted, it returns to step S133, and similar processing is subsequently repeated.

Alternatively, if the NFC communication apparatus has determined in step S142 that the command PSL_REQ has been transmitted from the initiator, that is, when the NFC communication apparatus has received the command PSL_REQ, it proceeds to step S143. The NFC communication apparatus transmits the response RSL_RES to the command RSL_REQ. This ends the communication with the initiator, and the process ends.

Figure 16:
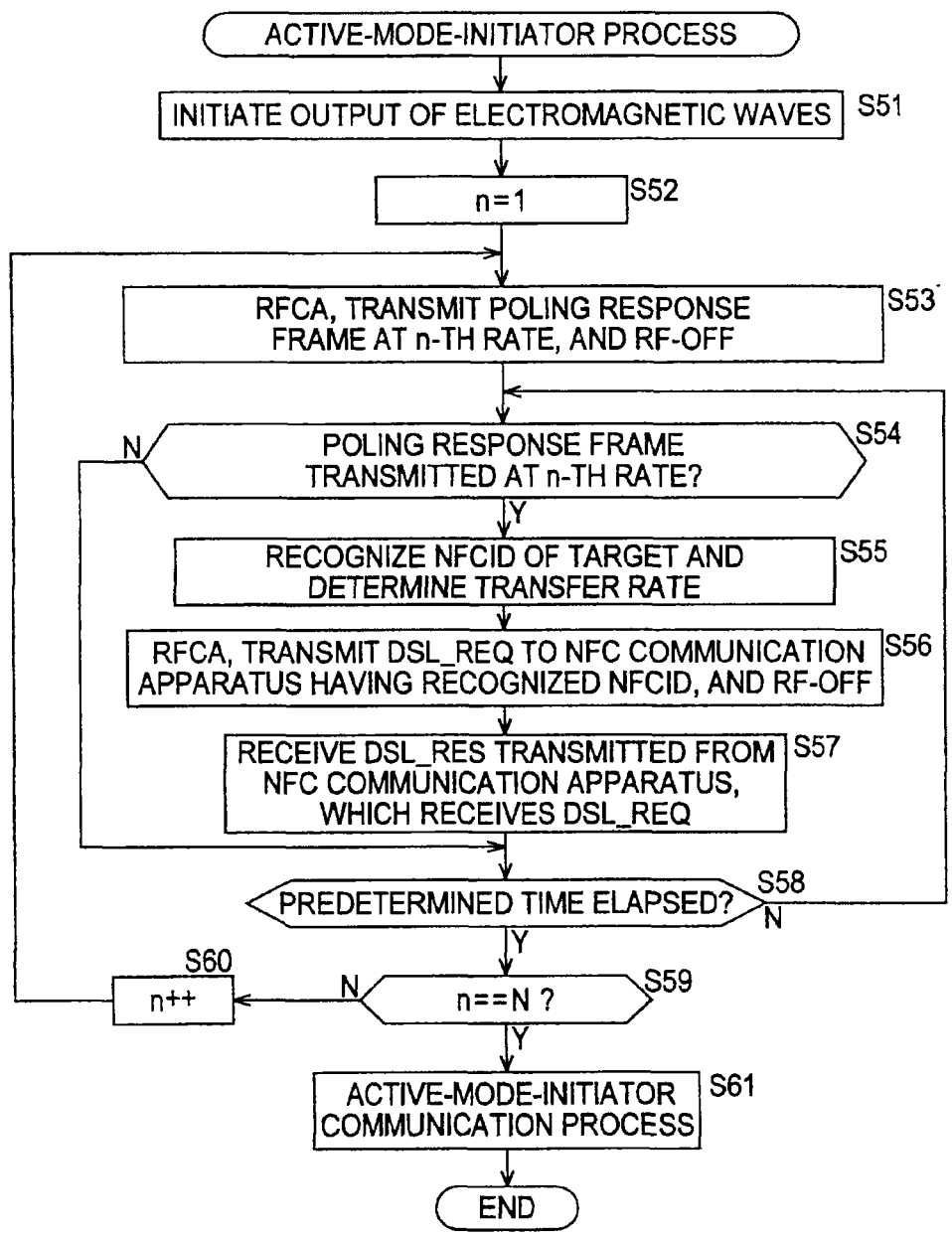
FIG. 16 is a flowchart showing a process of an active-mode-initiator process.
Figure 21:
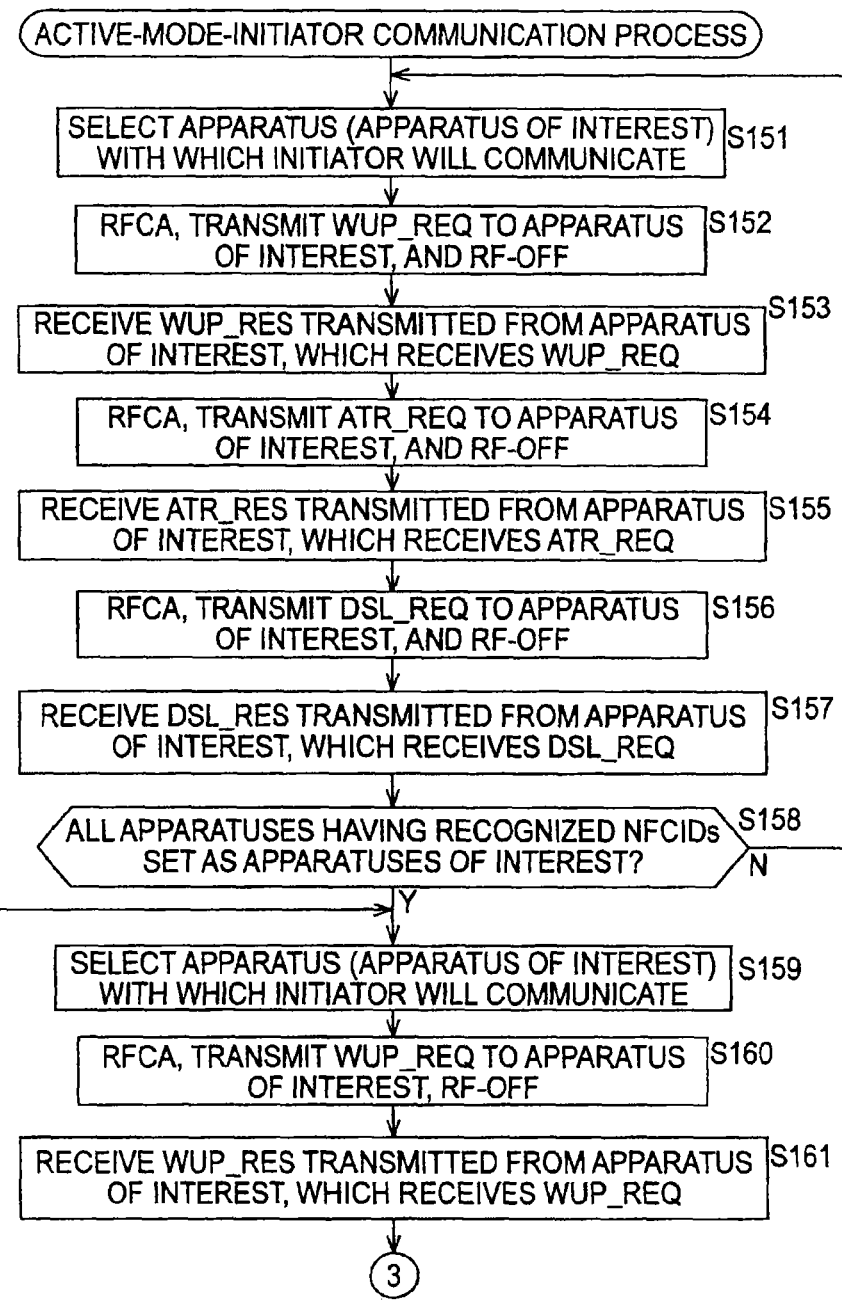
FIG. 21 is a flowchart showing an active-mode-initiator communication process.
Figure 22:
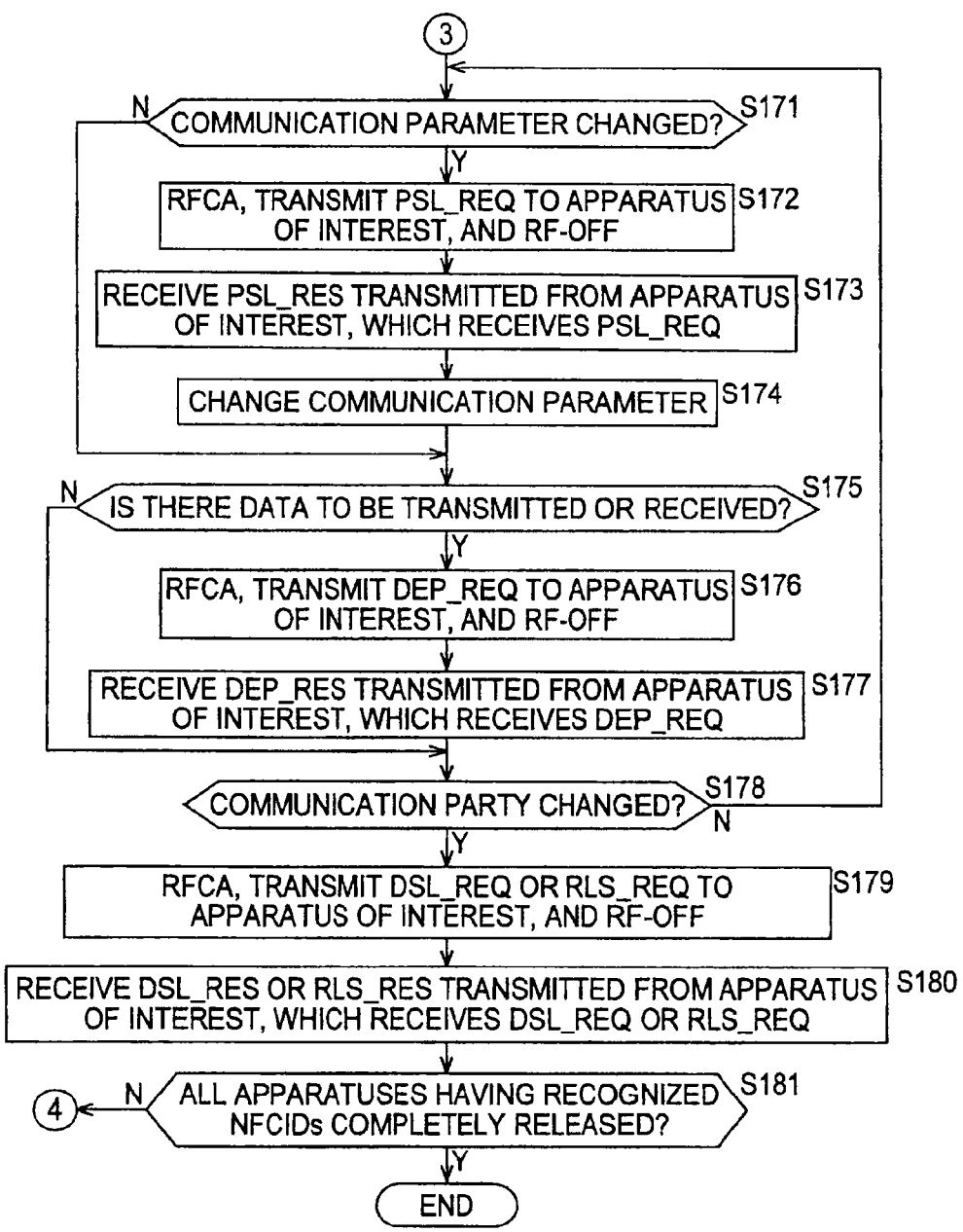
FIG. 22 is a flowchart showing an active-mode-initiator communication process.

Next, FIG. 21 and FIG. 22 are flowcharts showing details of the active-mode-initiator communication process in step S61 in FIG. 16.

In the passive-mode-initiator communication process illustrated in FIG. 18 and FIG. 19, the initiator continuously outputs electromagnetic waves, while, in the active-mode-initiator communication process in FIG. 21 and FIG. 22, the initiator initiates output of electromagnetic waves by performing the active RFCA processing before transmitting a command, and performs processing (OFF processing) for stopping outputting the electromagnetic waves after ending the transmission of the command. Excluding the above point, in the active-mode-initiator communication process in FIG. 21, in each of steps S151 to S161, and steps S171 to S181 in FIG. 22, processing similar to the case of each of steps S91 to S101 in FIG. 18 and steps S111 to S121 in FIG. 19 is performed. Accordingly, its description is omitted.

Figure 17:
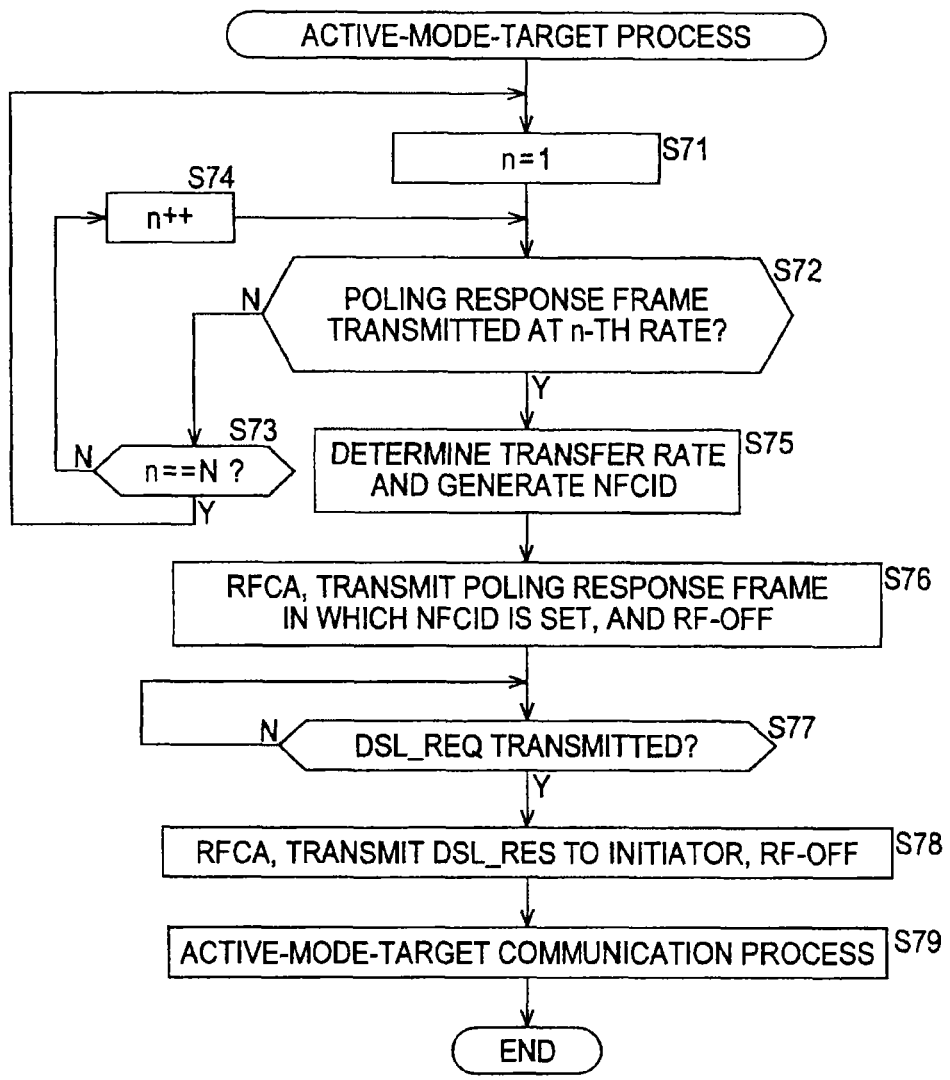
FIG. 17 is a flowchart showing a process of an active-mode-target process.
Figure 23:
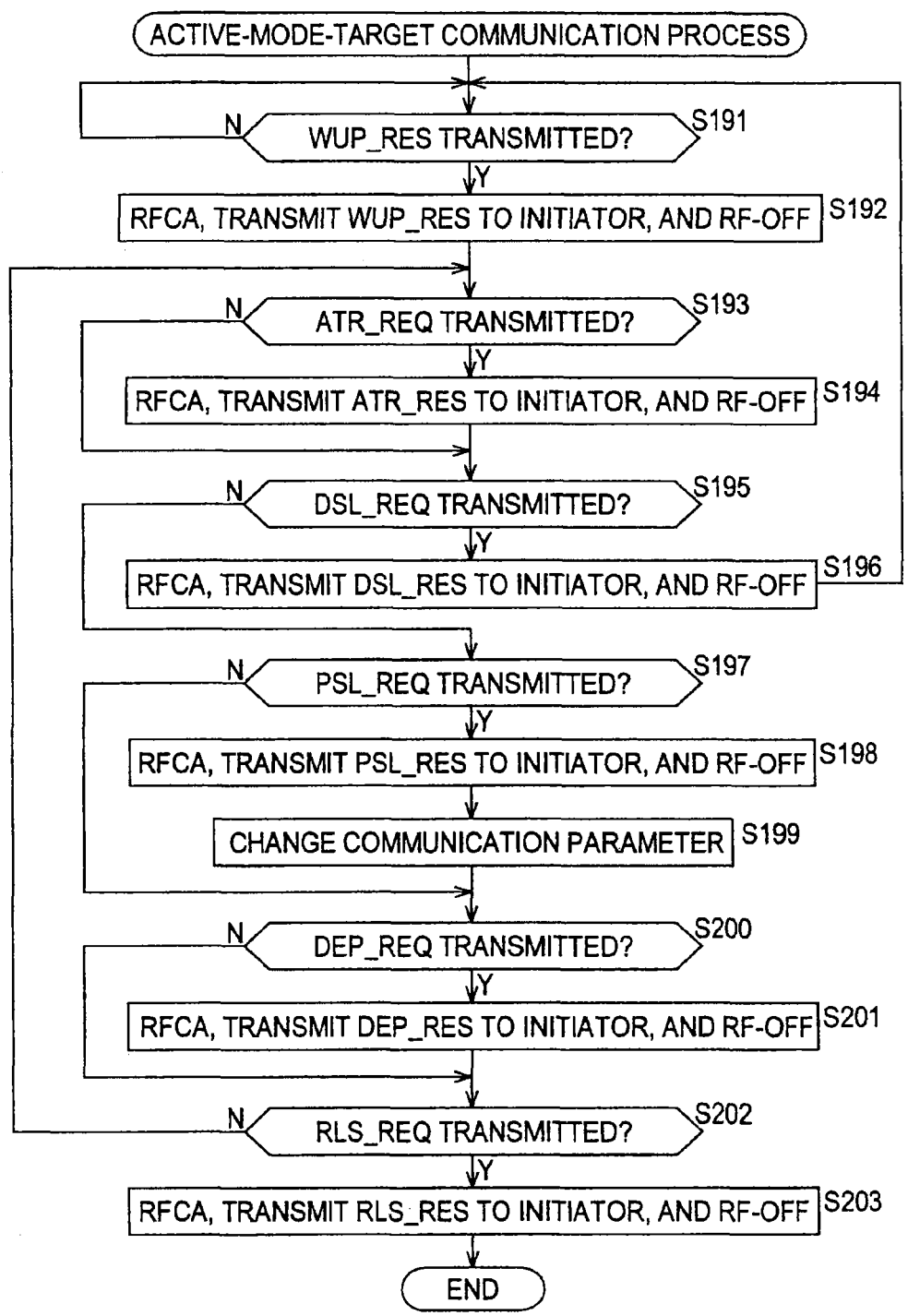
FIG. 23 is a flowchart showing an active-mode-target communication process.

Next, FIG. 23 is a flowchart showing details of the active-mode-target communication process in step S79 in FIG. 17.

Figure 20:
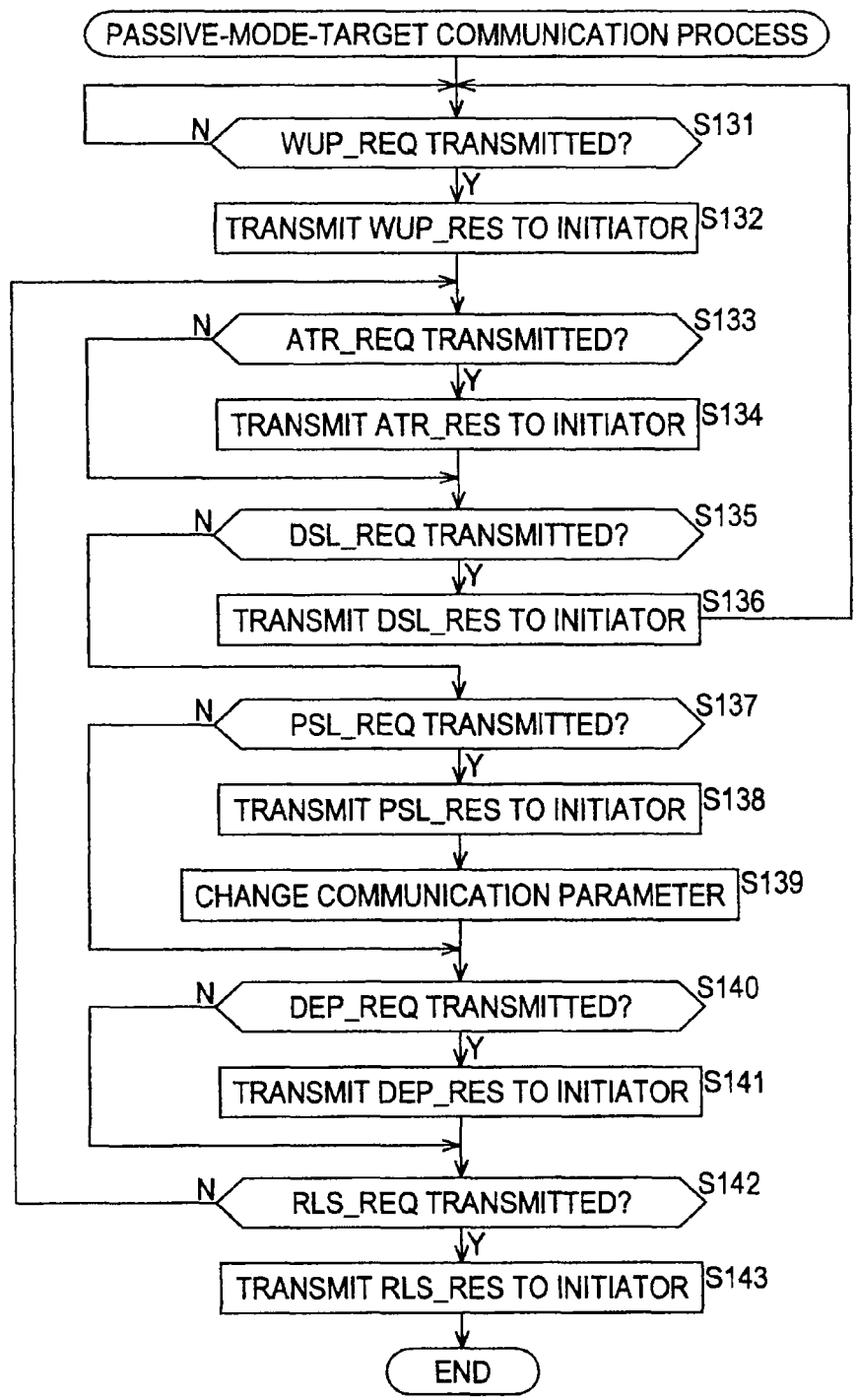
FIG. 20 is a flowchart showing a passive-mode-target communication process.

In the passive-mode-target communication process illustrated in FIG. 20, the target transmits data by performing load modulation on electromagnetic waves output by the initiator, while, in the active-mode-target communication process in FIG. 23, the target initiates output of electromagnetic waves by performing the active RFCA processing before transmitting a command, and performs processing (OFF processing) for stopping outputting the electromagnetic waves after ending the transmission of the command. Excluding the above point, in the active-mode-target communication process in FIG. 23, in each of steps S191 to S203, processing similar to the case of each of steps S131 to S143 in FIG. 20 is performed. Accordingly, its description is omitted.

Next, in communication by the NFC communication apparatus, for example, a communication protocol called NFCIP (Near Field Communication Interface and Protocol)-1 is employed.

FIG. 24 to FIG. 29 are illustrations of details of NFCIP-1 employed in communication by the NFC communication apparatus.

Figure 24:
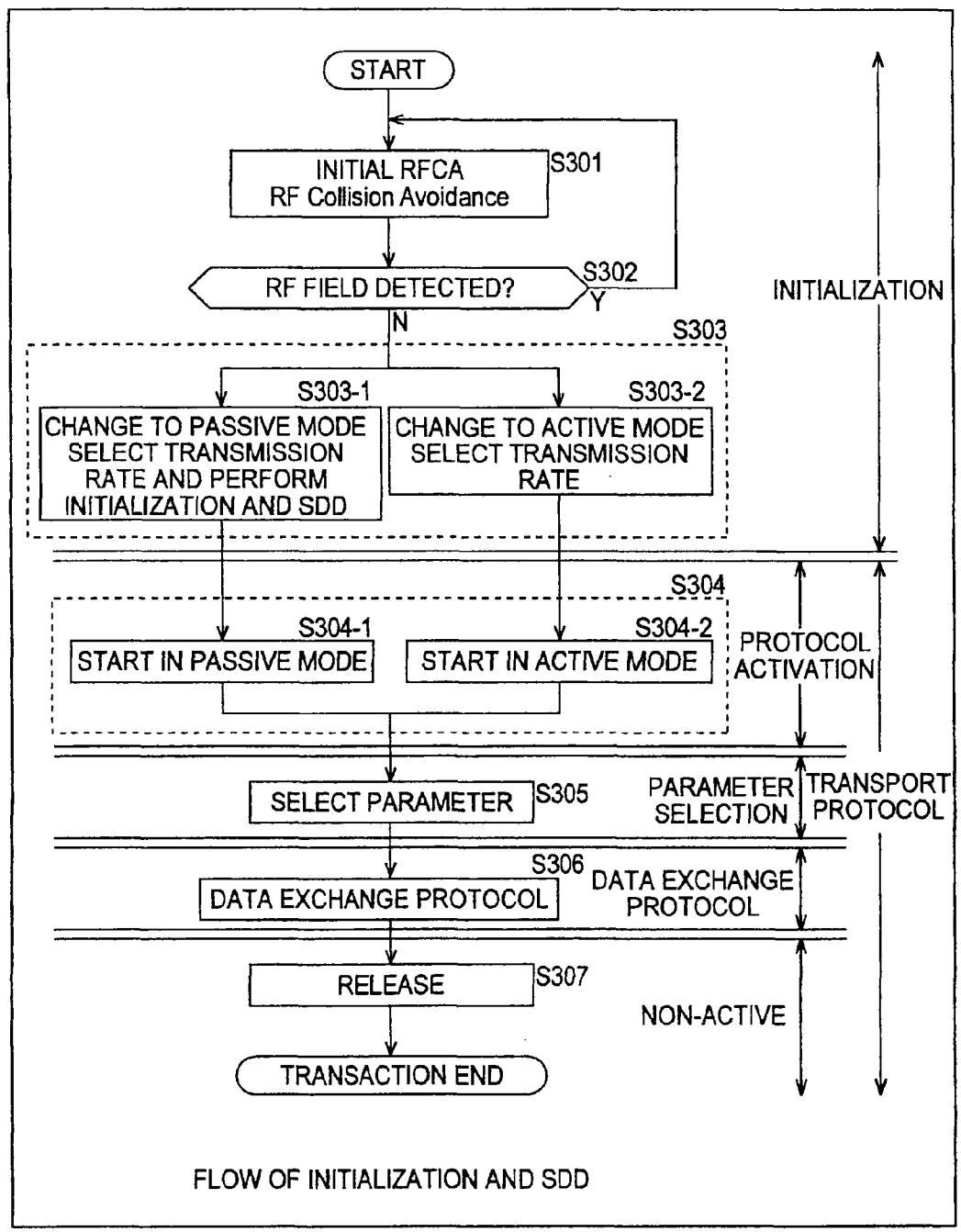
FIG. 24 is a flowchart illustrating common initialization and SDD performed by an NFC communication apparatus.

Specifically, FIG. 24 is a flowchart illustrating common initialization and SDD processing performed by an NFC communication apparatus which performs communication based on NFCIP-1.

At first, in step S301, the NFC communication apparatus, which becomes an initiator, performs initial RFCA processing, and proceeds to step S302. In step S302, the NFC communication apparatus, which becomes the initiator, determines whether to have detected an RF field by the initial RFCA processing in step S301. If the NFC communication apparatus has determined in step S302 to have detected the RF field, it returns to step S301, and similar processing is subsequently repeated. In other words, while detecting the RF field, the NFC communication apparatus, which becomes the initiator, forms no RF field so as not to interfere with communication by another NFC communication apparatus, which forms the RF field.

Alternatively, if the NFC communication apparatus has determined in step S302 not to have detected the RF field, it proceeds to step S303, and performs, in the initiator state, communication mode and transmission mode selection, etc.

Specifically, in the case of performing passive mode communication, the NFC communication apparatus proceeds from step S302 to step S303-1 between steps S303-1 and S303-2 forming step S303, changes the communication mode to the passive mode in the initiator state, and selects a transfer rate. Also, in step S303-1, the NFC communication apparatus, which becomes the initiator, performs initialization and SDD processing, and proceeds to step S304-1 between steps S304-1 and S304-2 forming step S304.

In step S304-1, the NFC communication apparatus is activated (starts) in the passive mode, and proceeds to step S305.

Alternatively, in the case of performing active mode communication, the NFC communication apparatus proceeds from step S302 to step S303-2 between steps S303-1 and S303-2 forming step S303, changes the communication mode to the active mode in the initiator state, selects the transfer rate, and proceeds to step S304-2 between steps S304-1 and S304-2 forming step S304.

In step S304-2, the NFC communication apparatus is activated in the active mode and proceeds to step S305.

In step S305, the NFC communication apparatus selects the communication parameter required for communication and proceeds to step S306. In step S306, the NFC communication apparatus performs data exchange (communication)

based on a data exchange protocol in accordance with the communication parameter selected in step S305, and ends the data exchange before proceeding to step S307. In step S307, the NFC communication apparatus is deactivated and ends the transaction.

The NFC communication apparatus can be set by default to be, for example, a target. The NFC communication apparatus, which is set to be the target, forms no RF field, and is on standby until a command is transmitted from the initiator (until the initiator forms an RF field).

Also, the NFC communication apparatus can become an initiator, for example, in accordance with a request from an application. For example, an application can determine which of the active mode and the passive mode the communication mode is, and can select (determine) the transfer rate.

The NFC communication apparatus, which becomes the initiator, forms an RF field if no RF field is formed in the exterior, and the target is activated by the RF field formed by the initiator.

After that, the initiator transmits a command in the selected communication mode and transfer rate, and the target sends back a response (responds) at a communication mode and transfer rate identical to those of the initiator.

Figure 25:
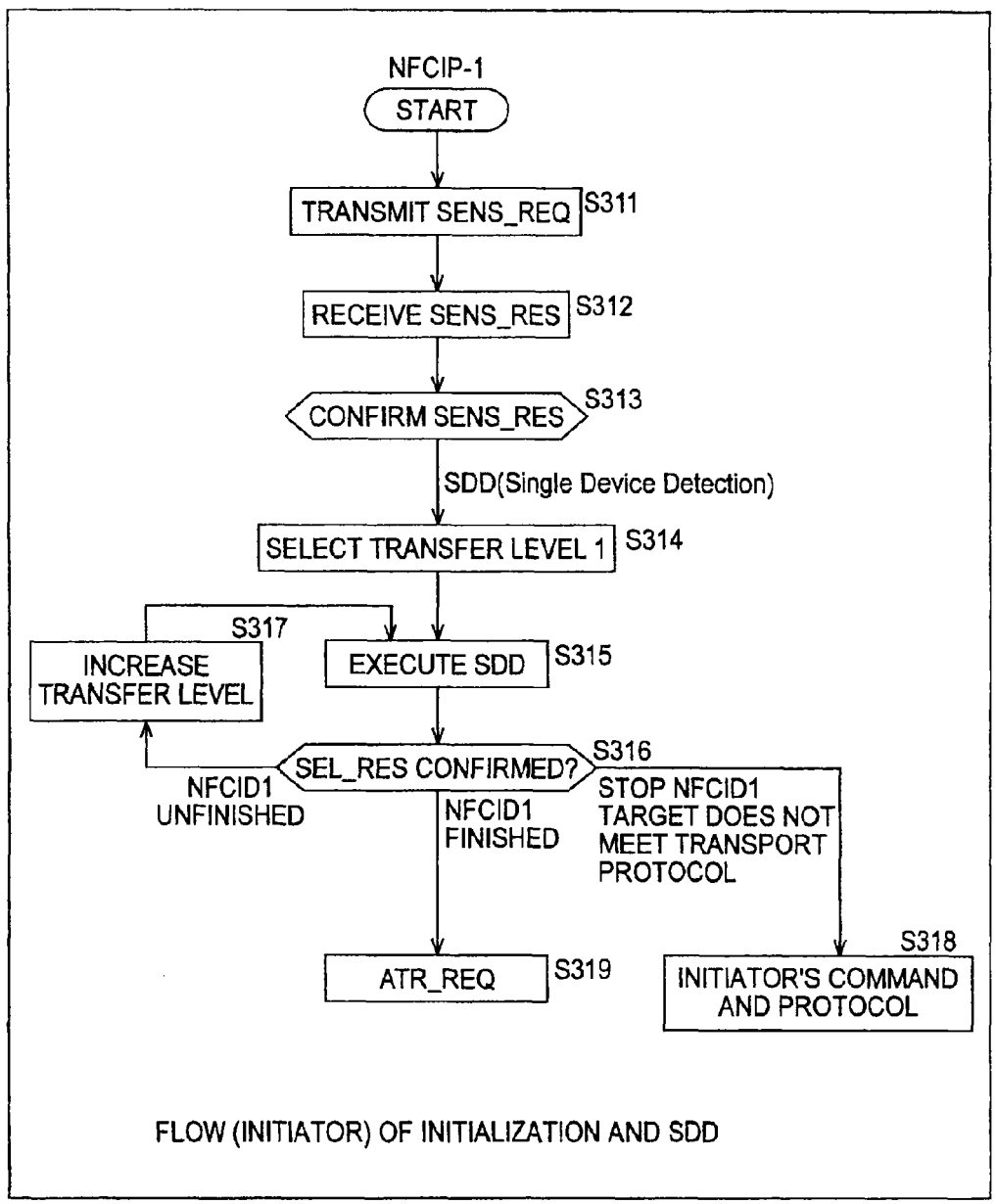
FIG. 25 is a flowchart illustrating initialization and SDD performed by an initiator.

Next, FIG. 25 is a flowchart illustrating initialization and SDD performed by the NFC communication apparatus, which becomes the initiator.

At first, in step S311, the initiator transmits the command SENS_REQ for searching for a target existing in the RF field formed by the initiator, and proceeds to step S312. In step S312, the initiator receives the response SENS_RES to the command SENS_REQ, which is transmitted from the target existing in the RF field formed by the initiator, and proceeds to step S313.

In step S313, the initiator confirms the content of the response SENS_RES from the target which is received in step S312. In other words, the response SENS_RES includes pieces of information of NFCID1 size bit frame and bit frame SDD. In step S313, the initiator confirms the contents of the pieces of information.

After that, proceeding from step S313 to S314, the initiator selects cascade (transfer) level 1 and executes SDD. Specifically, in step S314, the initiator transmits the SDD requiring command SDD_REQ, and transmits the command SEL_REQ to request selection of a target. In the command SEL_REQ, information representing the present cascade level is located.

The initiator waits for the response SEL_RES to the command SEL_REQ to be transmitted from the target, receives the response SEL_RES, and proceeds from step S315 to S316.

Here, the response SEL_RES includes any one of information indicating that the target does not end the communication based on NFCIP-1, information indicating that the target meets an NFC transport protocol and ends the communication based on NFCIP-1, and information representing that the target does not meet the NFC transport protocol and ends the communication based on NFCIP-1.

In step S316, by confirming the content of the response SEL_RES received from the target, the initiator determines which of the information indicating that the target does not end the communication based on NFCIP-1, the information indicating that the target meets the NFC transport protocol and ends the communication based on NFCIP-1, and the information representing that the target does not meet the NFC transport protocol and ends the communication based on NFCIP-1, is included in the response SEL_RES.

If the initiator has determined in step S316 that the response SEL_RES includes the information indicating that the target does not end the communication based on NFCIP-1, it proceeds to step S317, and increases the cascade level from the present value. The initiator returns from step S317 to S315, and subsequently repeats similar processing.

Also, if the initiator has determined in step S316 that the response SEL_RES includes the information indicating that the target meets the NFC transport protocol and ends the communication based on NFCIP-1, the initiator ends the communication based on NFCIP-1 and proceeds to step S319. In step S319, the initiator transmits the command ATR_REQ. Subsequently, communication using the commands and responses shown in FIG. 12 is performed between the initiator and the target.

In addition, if the initiator has determined in step S316 that the response SEL_RES includes the information representing that the target does not meet the NFC transport protocol and ends the communication based on NFCIP-1, the initiator ends the communication based on NFCIP-1 and proceeds to step S318. In step S318, the initiator performs communication using its own commands and protocol with the target.

Figure 26:
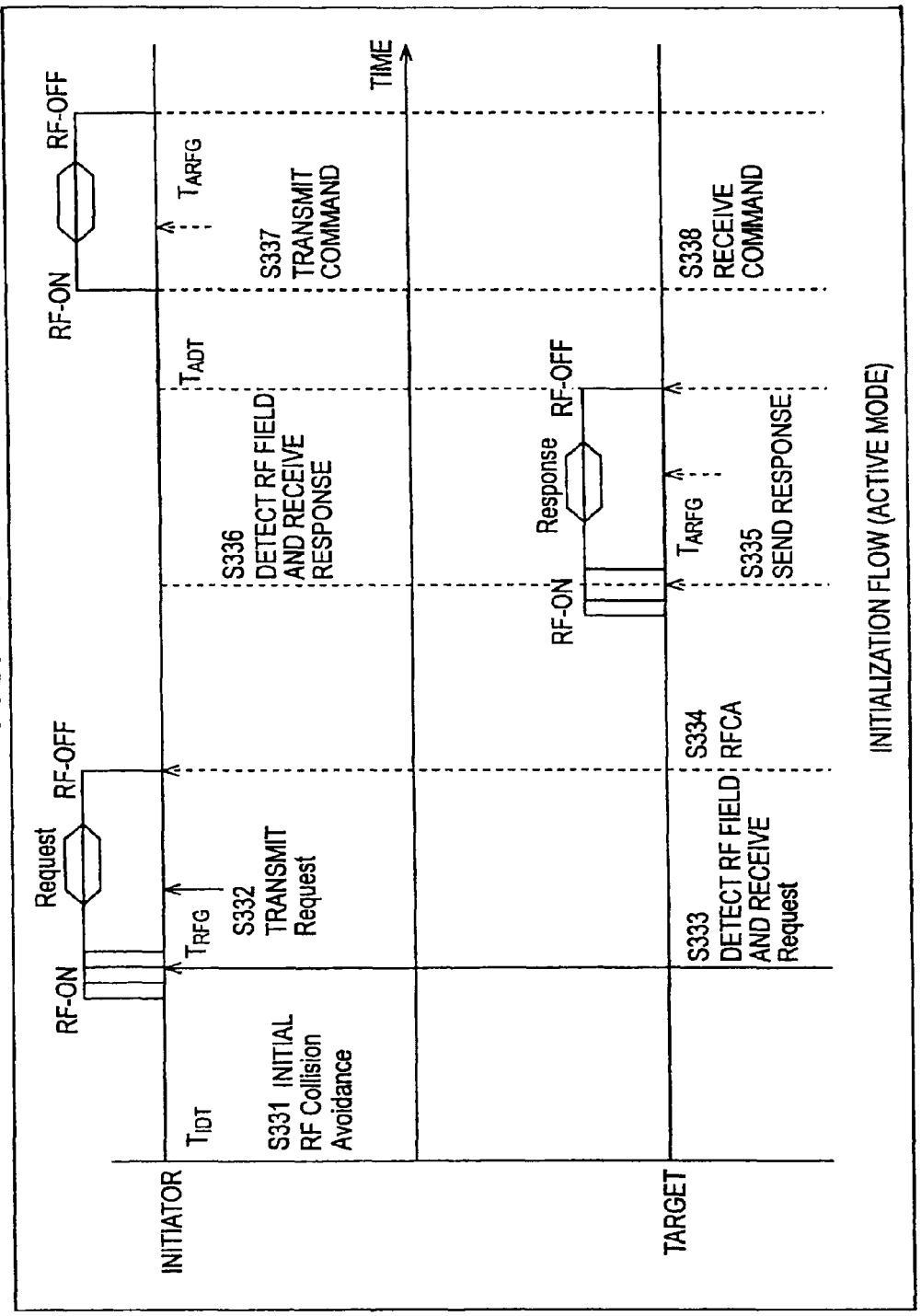
FIG. 26 is a timing chart illustrating initialization in an active mode.

Next, FIG. 26 is a timing chart illustrating initialization performed in the active mode by the initiator and the target.

After performing initial RFCA processing in step S331, the initiator proceeds to step S332 and forms an RF field (sets the RF field to be on). In step S332, the initiator transmits a command (Request), and stops the formation of the RF field (sets the RF field to be off). Here, in step S332, the initiator selects, for example, a transfer rate and transmits the command ATR_REQ at the transfer rate.

At the same time, in step S333, the target detects the RF field formed in step S332 by the initiator, and receives the command transmitted by the initiator before proceeding to step S334. In step S334, the target performs response RFCA processing, waits for the RF field formed by the initiator to be off, and proceeds to step S335. The target sets the RF field to be on. In step S335, the target transmits a response to the command received in step S333, and sets the RF field to be off. Here, in step S335, the target transmits, for example, the response ATR_RES to the command ATR_REQ transmitted from the initiator at a transfer rate identical to that for the command ATR_REQ.

The response transmitted in step S335 by the target is received by the initiator. Proceeding from step S336 to S337, the initiator performs response RFCA processing, waits for the RF field formed by the target to be off, and proceeds to step S337 to set the RF field to be on. In addition, in step S337, the initiator transmits a command and sets the RF field to be off. Here, in step S337, the initiator can transmit the command PSL_REQ in order to change, for example, a communication parameter. In step S337, by transmitting, for example, the command DEP_REQ, the initiator can initiate data exchange based on a data exchange protocol.

The command transmitted in step S337 by the initiator is received by the target. Subsequently, similar communication between the initiator and the target is performed.

Figure 27:
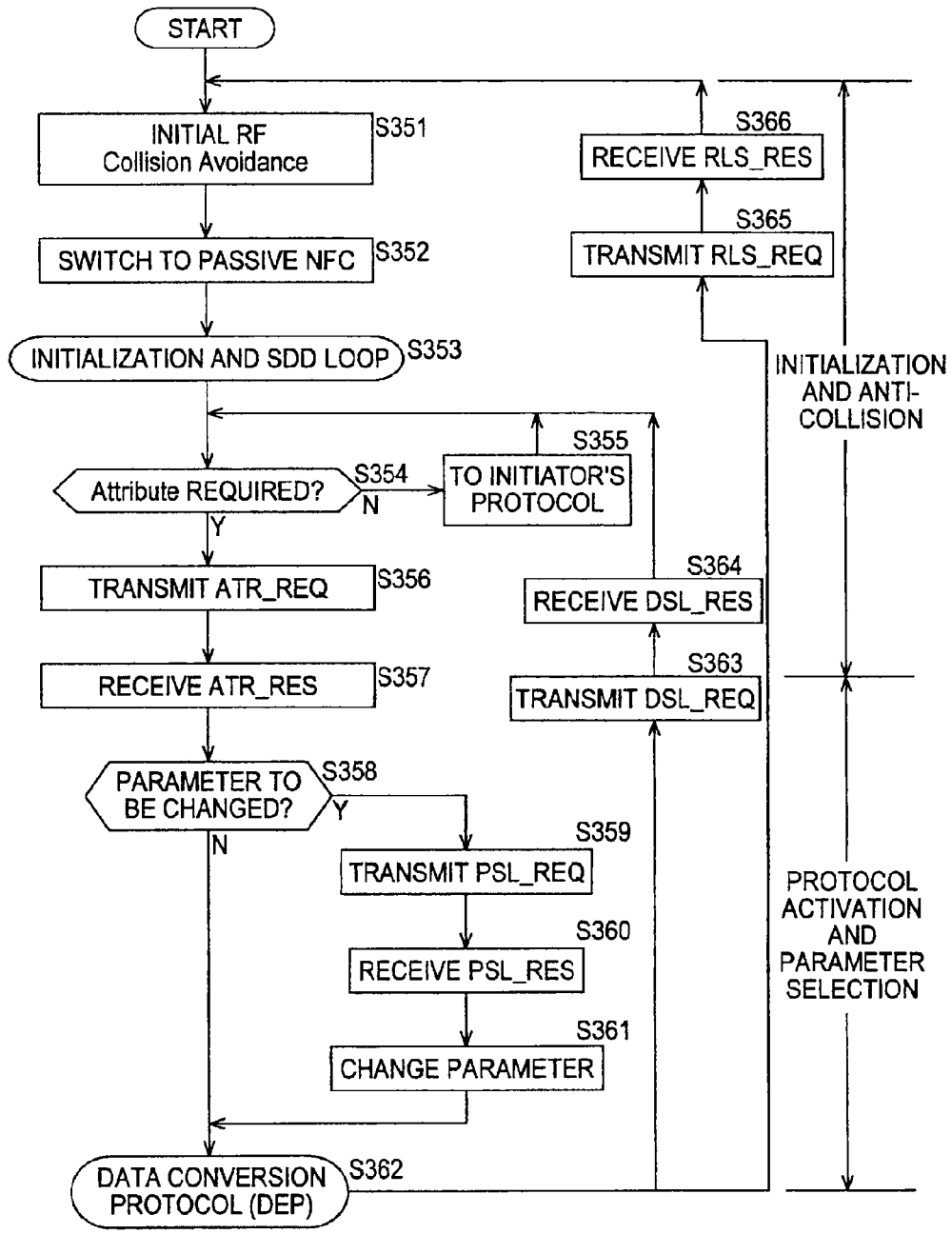
FIG. 27 is a flowchart illustrating an activation protocol in a passive mode.

Next, a passive-mode activation protocol is described with reference to the flowchart in FIG. 27.

At first, in step S351, the initiator performs initial RFCA processing, and proceeds to steps S352 and sets the communication mode to the passive mode. Proceeding to step S353, the initiator performs initialization and SDD and selects a transfer rate.

After that, proceeding to step S354, the initiator determines whether to request an attribute from the target. If the initiator has determined not to request the attribute from the target in step S354, it proceeds to step S335. The initiator performs communication with the target in accordance with its own protocol. It returns to step S354 and repeats similar processing.

Alternatively, if the initiator has determined in step S334 to request the attribute from the target, it proceeds to step S356. The initiator transmits the command ATR_REQ. This requests the attribute from the target. The initiator waits for the response ATR_RES to the command ATR_REQ to be transmitted from the target, and proceeds to step S357. The initiator receives the response ATR_RES and proceeds to step S358.

In step S358, based on the response ATR_RES received from the target in step S357, the initiator determines whether the communication parameter, that is, for example, the transfer rate, can be changed. If the initiator has determined in step S358 that the transfer rate cannot be changed, it skips over steps S359 and S361 and proceeds to step S362.

Alternatively, if the initiator has determined in step S358 that the transfer rate can be changed, it proceeds to step S359. The initiator transmits the command PSL_REQ. This request the target to change the transfer rate. The initiator waits for the response PSL_RES to the command PSL_REQ to be transmitted from the target, and proceeds from step S359 to S360. The initiator receives the response PSL_RES, and proceeds to step S361. In step S361, in accordance with the response PSL_RES received in step S360, the initiator changes the communication parameter, that is, for example, the transfer rate, and proceeds to step S362.

In step S362, the initiator exchanges data with the target in accordance with a data exchange protocol. After that, the initiator proceeds to step S363 or S365.

In other words, when the initiator sets the target to be in the deselect state, it proceeds from step S362 to S363 and transmits the command DSL_REQ. The initiator waits for the response DSL_RES to the command DSL_REQ to be transmitted from the target, and proceeds from step S363 to S364. After receiving the response DSL_RES, the initiator returns to step S354 and subsequently repeats similar processing.

At the same time, when completely ending the communication with the target, the initiator proceeds from step S362 to S365, and transmits the command RLS_REQ. The initiator waits for the response RLS_RES to the command RLS_REQ to be transmitted from the target, and proceeds from step S365 to S366. After receiving the response RLS_RES, the initiator returns to step S351, and subsequently repeats similar processing.

Figure 28:
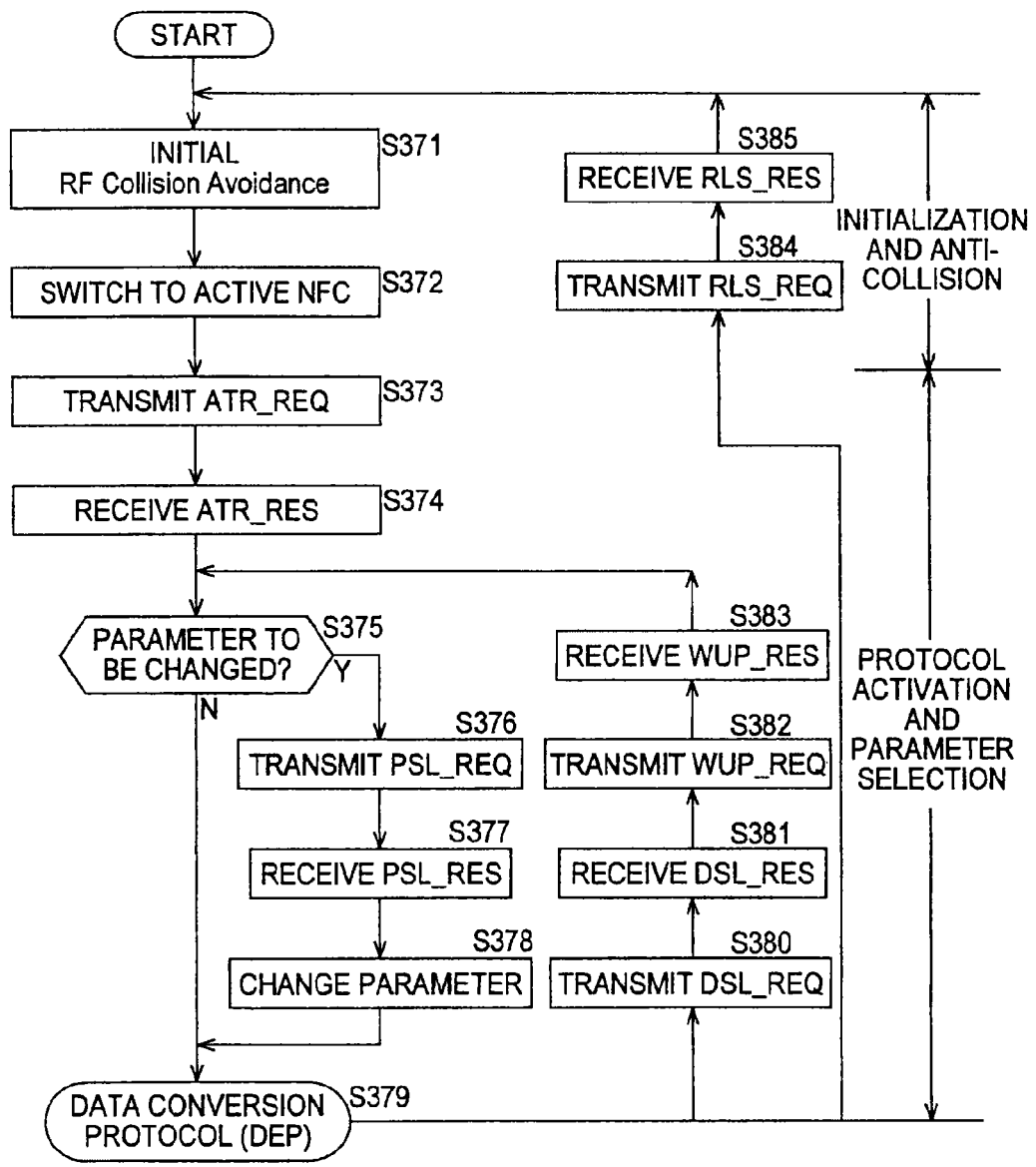
FIG. 28 is a flowchart illustrating an activation protocol in an active mode.

Next, an active-mode activation protocol is described with reference to the flowchart in FIG. 28.

At first, in step S371, the initiator performs initial RFCA processing, and proceeds to step S372. The initiator sets the communication mode to the active mode. Proceeding to step S373, the initiator transmits the command ATR_REQ. This requests an attribute from the target. The initiator waits for the response ATR_RES to the command ATR_REQ to be transmitted from the target, and proceeds to step S374. The initiator receives the response ATR_RES, and proceeds to step S375.

In step S375, based on the response ATR_RES received from the target in step S374, the initiator determines whether the communication parameter, that is, for example, the transfer rate, can be changed. If the initiator has determined in step S375 that the transfer rate cannot be changed, it skips over steps S376 to S378 and proceeds to step S379.

Alternatively, if the initiator has determined in step S375 that the transfer rate can be changed, it proceeds to step S376, and transmits the command PSL_REQ. This requests the target to change the transfer rate. The initiator waits for the response PSL_RES to the command PSL_REQ to be transmitted from the target, and proceeds from step S376 to S377. The initiator receives the response PSL_RES, and proceeds to step S379. In step S378, in accordance with the response PSL_RES received in step S377, the initiator changes the communication parameter, that is, for example, the transfer rate, and proceeds to step S379.

In step S379, in accordance with a data exchange protocol, the initiator exchanges data with the target. After that, the initiator proceeds to step S380 or S384, if needed.

In other words, when the initiator sets the target, with which it is communicating, to be in the deselect state, and wakes up any of targets, which have already been in the deselect state, it proceeds from step S379 to S380, and transmits the command DSL_REQ. After the initiator waits for the response DSL_RES to the command DSL_REQ to be transmitted from the target, it proceeds from step S380 to S381, and receives the response DSL_RES. Here, the target, which has transmitted the response DSL_RES, is set to be in the deselect state.

After that, proceeding from step S381 to S382, the initiator transmits the command WUP_REQ. After the initiator waits for the response WUP_RES to the command WUP_REQ, it proceeds from step S382 to S383, receives the response WUP_RES, and returns to step S375. Here, the target, which has transmitted the response WUP_RES, is waked up, and the waked-up target is subject to processing in step S375 and thereafter which is performed by the initiator.

In addition, when completely ending the communication with the target, the initiator proceeds from step S379 to S384, and transmits the command RLS_REQ. After the initiator waits for the response RLS_RES to the command RLS_REQ to be transmitted from the target, it proceeds from step S384 to S385, and receives the response RLS_RES before returning to step S371. The initiator subsequently repeats similar processing.

Next, FIG. 29 shows NFCIP-1 protocol commands for use in NFCIP-1 and responses to the commands.

The commands and responses shown in FIG. 29 are identical to the commands and responses shown in FIG. 12. However, FIG. 12 shows only the mnemonics of the commands and responses, but FIG. 29 shows, not only mnemonics, but also definitions of the commands.

The commands ATR_REQ, WUP_REQ, PSL_REQ, DEP_REQ, DSL_REQ, and RLS_REQ are transmitted by the initiator, and the responses ATR_REQ, WUP_RES, PSL_RES, DEP_RES, DSL_RES, and RLS_RES are transmitted by the target.

However, the command WUP_REQ is transmitted only when the initiator is in the active mode, and the response WUP_RES is transmitted only when the target is in the active mode.

In this specification, processing steps which describe processing performed by an NFC communication apparatus do not always need to be time-sequentially performed in the order shown as flowcharts, but include steps executed in parallel or separately (For example, parallel processing or object-based processing).

INDUSTRIAL APPLICABILITY

As described above, the present invention enables various types of near field communication.

The invention claimed is:

1. A communication system, comprising:

a first data processing apparatus and a second data processing apparatus, for performing, by the first and second data processing apparatuses, an electromagnetic-induction communication using a carrier having a single frequency, the first and second data processing apparatuses each comprising modulating means for modulating the carrier into a signal of data to be transmitted at one of a plurality of transfer rates; and demodulating means for demodulating a signal of data transmitted at the one of a plurality of transfer rates, a transfer rate between the first and second data processing apparatuses being changeable for one transaction, the first data processing apparatus further comprising a processing unit configured to determine whether the first data processing apparatus has received electromagnetic waves caused by another apparatus, wherein the first data processing apparatus transmits a polling request to the second data processing apparatus and receives a polling response from the second data processing apparatus in response to the polling request, the polling response including an identification of the second data processing apparatus, the first data processing apparatus transmits the polling request when the processing unit of the first data processing apparatus determines that the first data processing apparatus has not received the electromagnetic waves caused by the another apparatus, and when the processing unit of the first data processing apparatus determines that the transfer rate can be changed based on information specifying the plurality of transfer rates, transmitted from the second data processing apparatus, the first data processing apparatus transmits to the second data processing apparatus a request specifying a specified transfer rate, the second data processing apparatus sends a response to the first data processing apparatus in response to the request, and the processing unit of the first data processing apparatus changes the transfer rate to the specified transfer rate in response to the response.

* * * * *